United States Patent
Giobbi et al.

(10) Patent No.: US 9,542,542 B2
(45) Date of Patent: Jan. 10, 2017

(54) SINGLE STEP TRANSACTION AUTHENTICATION USING PROXIMITY AND BIOMETRIC INPUT

(75) Inventors: John J. Giobbi, Bend, OR (US); David L. Brown, Jupiter, FL (US); Fred S. Hirt, Brookfield, IL (US)

(73) Assignee: Proxense, LLC, Bend, OR (US)

( * ) Notice: Subject to any disclaimer, the term of this patent is extended or adjusted under 35 U.S.C. 154(b) by 18 days.

(21) Appl. No.: 11/745,249

(22) Filed: May 7, 2007

(65) Prior Publication Data

US 2007/0245158 A1    Oct. 18, 2007

Related U.S. Application Data

(60) Provisional application No. 60/798,172, filed on May 5, 2006, provisional application No. 60/798,843, filed
(Continued)

(51) Int. Cl.
*G06F 21/32* (2013.01)
*G06F 21/31* (2013.01)
(Continued)

(52) U.S. Cl.
CPC .............. *G06F 21/32* (2013.01); *G06F 21/31* (2013.01); *G06F 21/34* (2013.01);
(Continued)

(58) Field of Classification Search
CPC ................................................. G06Q 20/3674
(Continued)

(56) References Cited

U.S. PATENT DOCUMENTS 4,759,060 A    7/1988   Hayashi et al.
4,993,068 A    2/1991   Piosenka et al.
(Continued)

FOREIGN PATENT DOCUMENTS

WO    WO 00/62505 A1    10/2000
WO    WO 01/22724 A1    3/2001
(Continued)

OTHER PUBLICATIONS

"Alliance Activities: Publications: Identity—Smart Card Alliance," Smart Card Alliance, 1997-2007, [online] [Retrieved on Jan. 7, 2007] Retrieved from the Internet<URL:http://www.smartcardalliance.org/pages/publications-identity>.
(Continued)

*Primary Examiner* — Mamon Obeid
(74) *Attorney, Agent, or Firm* — Patent Law Works LLP

(57) ABSTRACT

A system and method provide efficient, secure and highly reliable authentication for transaction processing and/or access control applications in which only biometric input is required from the user. A Personal Digital Key stores a biometric profile that comprises a representation of physical or behavioral characteristics that are uniquely associated with an individual that owns and carries the PDK. The PDK wirelessly transmits the biometric profile over a secure wireless transaction to a Reader for use in a biometric authentication process. The Reader compares the received biometric profile to a biometric input acquired at the point of transaction in order to determine if the transaction should be authorized.

20 Claims, 11 Drawing Sheets

Related U.S. Application Data on May 8, 2006, provisional application No. 60/838,788, filed on Aug. 17, 2006, provisional application No. 60/824,758, filed on Sep. 6, 2006, provisional application No. 60/894,608, filed on Mar. 13, 2007.

(51) Int. Cl.
*G06F 21/34* (2013.01)
*H04L 29/06* (2006.01)
*H04W 12/06* (2009.01)

(52) U.S. Cl.
CPC ......... *H04L 63/0861* (2013.01); *H04W 12/06* (2013.01); *G06F 2221/2115* (2013.01)

(58) Field of Classification Search
USPC .. 382/115–118, 124; 340/5.53, 5.83; 705/64, 67
See application file for complete search history.

(56) References Cited

U.S. PATENT DOCUMENTS

| | | |
|---|---|---|
| 5,187,352 A | 2/1993 | Blair et al. |
| 5,296,641 A | 3/1994 | Stelzel |
| 5,325,285 A | 6/1994 | Araki |
| 5,392,433 A | 2/1995 | Hammersley et al. |
| 5,416,780 A | 5/1995 | Patel |
| 5,422,632 A | 6/1995 | Bucholtz et al. |
| 5,450,489 A | 9/1995 | Ostrover et al. |
| 5,619,251 A | 4/1997 | Kuroiwa et al. |
| 5,629,980 A | 5/1997 | Stefik et al. |
| 5,644,354 A | 7/1997 | Thompson et al. |
| 5,666,412 A | 9/1997 | Handelman et al. |
| 5,784,464 A | 7/1998 | Akiyama et al. |
| 5,825,876 A | 10/1998 | Peterson, Jr. |
| 5,857,020 A | 1/1999 | Peterson, Jr. |
| 5,892,825 A | 4/1999 | Mages et al. |
| 5,894,551 A | 4/1999 | Huggins et al. |
| 5,898,880 A | 4/1999 | Ryu |
| 5,917,913 A | 6/1999 | Wang |
| 5,928,327 A | 7/1999 | Wang et al. |
| 5,991,399 A | 11/1999 | Graunke et al. |
| 5,991,749 A | 11/1999 | Morrill, Jr. |
| 6,016,476 A | 1/2000 | Maes et al. |
| 6,018,739 A * | 1/2000 | McCoy ............... G06K 9/00006 |
| 6,025,780 A * | 2/2000 | Bowers ............... G06K 19/0701 340/10.51 |
| 6,035,038 A | 3/2000 | Campinos et al. |
| 6,035,329 A | 3/2000 | Mages et al. |
| 6,038,334 A | 3/2000 | Hamid |
| 6,041,410 A | 3/2000 | Hsu et al. |
| 6,042,006 A | 3/2000 | Van Tilburg et al. |
| 6,055,314 A | 4/2000 | Spies et al. |
| 6,070,796 A | 6/2000 | Sirbu |
| 6,088,730 A | 7/2000 | Kato et al. |
| 6,104,334 A | 8/2000 | Allport |
| 6,121,544 A | 9/2000 | Petsinger |
| 6,148,142 A | 11/2000 | Anderson |
| 6,161,179 A | 12/2000 | Seidel |
| 6,185,316 B1 | 2/2001 | Buffam |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,237,848 B1 * | 5/2001 | Everett ............... G06K 7/0008 235/380 |
| 6,247,130 B1 | 6/2001 | Fritsch |
| 6,256,737 B1 | 7/2001 | Bianco et al. |
| 6,266,415 B1 | 7/2001 | Campinos et al. |
| 6,295,057 B1 | 9/2001 | Rosin et al. |
| 6,336,121 B1 | 1/2002 | Lyson et al. |
| 6,336,142 B1 | 1/2002 | Kato et al. |
| 6,363,485 B1 | 3/2002 | Adams et al. |
| 6,367,019 B1 | 4/2002 | Ansell et al. |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,715 B1 | 7/2002 | Saito |
| 6,425,084 B1 | 7/2002 | Rallis et al. |
| 6,434,535 B1 | 8/2002 | Kupka et al. |
| 6,446,130 B1 | 9/2002 | Grapes |
| 6,463,534 B1 | 10/2002 | Geiger et al. |
| 6,480,188 B1 | 11/2002 | Horsley |
| 6,490,443 B1 | 12/2002 | Freeny, Jr. |
| 6,510,350 B1 | 1/2003 | Steen, III et al. |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,805 B1 | 5/2003 | Ma et al. |
| 6,564,380 B1 | 5/2003 | Murphy |
| 6,628,302 B2 | 9/2003 | White et al. |
| 6,632,992 B2 | 10/2003 | Hasegawa |
| 6,647,417 B1 | 11/2003 | Hunter et al. |
| 6,667,684 B1 | 12/2003 | Waggamon et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,775,655 B1 | 8/2004 | Peinado et al. |
| 6,785,474 B2 * | 8/2004 | Hirt ............... H04B 10/506 398/53 |
| 6,804,825 B1 | 10/2004 | White et al. |
| 6,806,887 B2 | 10/2004 | Chernock et al. |
| 6,850,147 B2 | 2/2005 | Prokoski et al. |
| 6,873,975 B1 | 3/2005 | Hatakeyama et al. |
| 6,950,941 B1 | 9/2005 | Lee et al. |
| 6,963,971 B1 * | 11/2005 | Bush ............... H04L 9/0894 713/153 |
| 6,973,576 B2 | 12/2005 | Giobbi |
| 6,975,202 B1 | 12/2005 | Rodriguez et al. |
| 6,983,882 B2 | 1/2006 | Cassone |
| 7,012,503 B2 | 3/2006 | Nielsen |
| 7,090,126 B2 | 8/2006 | Kelly et al. |
| 7,112,138 B2 | 9/2006 | Hedrick et al. |
| 7,137,012 B1 | 11/2006 | Kamibayashi et al. |
| 7,155,416 B2 | 12/2006 | Shatford |
| 7,159,114 B1 * | 1/2007 | Zajkowski ......... G06Q 20/3552 380/259 |
| 7,191,466 B1 | 3/2007 | Hamid et al. |
| 7,218,944 B2 * | 5/2007 | Cromer ............... H04W 48/16 370/338 |
| 7,225,161 B2 * | 5/2007 | Lam ............... G06Q 20/367 705/50 |
| 7,242,923 B2 * | 7/2007 | Perera ............... H04W 12/06 455/410 |
| 7,249,177 B1 | 7/2007 | Miller |
| 7,278,025 B2 | 10/2007 | Saito |
| 7,305,560 B2 | 12/2007 | Giobbi |
| 7,314,164 B2 | 1/2008 | Bonalle |
| 7,317,799 B2 * | 1/2008 | Hammersmith ...... H04L 9/0822 380/260 |
| 7,341,181 B2 | 3/2008 | Bonalle |
| 7,370,366 B2 * | 5/2008 | Lacan ............... G06F 21/6245 713/182 |
| 7,424,134 B2 | 9/2008 | Chou |
| 7,529,944 B2 | 5/2009 | Hamid |
| 7,574,734 B2 | 8/2009 | Fedronic et al. |
| 7,587,611 B2 | 9/2009 | Johnson et al. |
| 7,617,523 B2 * | 11/2009 | Das ............... G06F 21/41 380/1 |
| 7,624,417 B2 * | 11/2009 | Dua ............... H04L 29/06027 725/114 |
| 7,640,273 B2 * | 12/2009 | Wallmeier ........... G06Q 20/102 |
| 7,644,443 B2 | 1/2010 | Matsuyama et al. |
| 7,715,593 B1 | 5/2010 | Adams et al. |
| 7,765,181 B2 * | 7/2010 | Thomas ............... G06F 9/4451 707/999.01 |
| 7,773,754 B2 * | 8/2010 | Buer ............... G06F 21/602 380/277 |

(56) References Cited

U.S. PATENT DOCUMENTS

| | | | | |
|---|---|---|---|---|
| 7,865,448 B2* | 1/2011 | Pizarro | G06Q 20/10 | |
| | | | 235/380 | |
| 7,883,417 B2 | 2/2011 | Bruzzese et al. | | |
| 7,904,718 B2 | 3/2011 | Giobbi et al. | | |
| 7,957,536 B2* | 6/2011 | Nolte | G06Q 20/02 | |
| | | | 380/278 | |
| 7,996,514 B2* | 8/2011 | Baumert | G06F 1/1632 | |
| | | | 709/203 | |
| 8,112,066 B2* | 2/2012 | Ben Ayed | G06Q 20/108 | |
| | | | 455/41.1 | |
| 8,135,624 B1* | 3/2012 | Ramalingam | G06Q 20/10 | |
| | | | 705/26.1 | |
| 8,352,730 B2* | 1/2013 | Giobbi | G06F 21/32 | |
| | | | 713/155 | |
| 8,432,262 B2* | 4/2013 | Talty | G06K 7/10237 | |
| | | | 340/10.1 | |
| 8,433,919 B2* | 4/2013 | Giobbi | G06F 21/31 | |
| | | | 713/186 | |
| 8,508,336 B2* | 8/2013 | Giobbi | G06F 19/322 | |
| | | | 235/382 | |
| 8,522,019 B2* | 8/2013 | Michaelis | G07C 9/00039 | |
| | | | 370/310 | |
| 8,918,854 B1* | 12/2014 | Giobbi | G06K 7/10366 | |
| | | | 726/9 | |
| 9,230,399 B2* | 1/2016 | Yacenda | G07F 17/3225 | |
| 9,276,914 B2* | 3/2016 | Woodward | H04W 12/06 | |
| 9,305,312 B2* | 4/2016 | Kountotsis | G07G 1/0036 | |
| 9,405,898 B2* | 8/2016 | Giobbi | G06F 21/44 | |
| 9,418,205 B2* | 8/2016 | Giobbi | G06F 19/323 | |
| 2001/0026619 A1* | 10/2001 | Howard, Jr. | G06F 21/602 | |
| | | | 380/279 | |
| 2001/0044337 A1 | 11/2001 | Rowe et al. | | |
| 2002/0007456 A1 | 1/2002 | Peinado et al. | | |
| 2002/0013772 A1 | 1/2002 | Peinado | | |
| 2002/0014954 A1 | 2/2002 | Fitzgibbon et al. | | |
| 2002/0015494 A1 | 2/2002 | Nagai et al. | | |
| 2002/0023032 A1 | 2/2002 | Pearson et al. | | |
| 2002/0026424 A1 | 2/2002 | Akashi | | |
| 2002/0071559 A1* | 6/2002 | Christensen | G06F 21/10 | |
| | | | 380/277 | |
| 2002/0073042 A1 | 6/2002 | Maritzen et al. | | |
| 2002/0091646 A1* | 7/2002 | Lake | G06Q 20/04 | |
| | | | 705/67 | |
| 2002/0098888 A1 | 7/2002 | Rowe et al. | | |
| 2002/0103027 A1 | 8/2002 | Rowe et al. | | |
| 2002/0104006 A1 | 8/2002 | Boate et al. | | |
| 2002/0104019 A1 | 8/2002 | Chatani | | |
| 2002/0108049 A1 | 8/2002 | Xu et al. | | |
| 2002/0109580 A1 | 8/2002 | Shreve et al. | | |
| 2002/0116615 A1* | 8/2002 | Nguyen | H04L 67/38 | |
| | | | 713/168 | |
| 2002/0129262 A1 | 9/2002 | Kutaragi et al. | | |
| 2002/0138767 A1 | 9/2002 | Hamid et al. | | |
| 2002/0140542 A1 | 10/2002 | Prokoski et al. | | |
| 2002/0144117 A1 | 10/2002 | Faigle | | |
| 2002/0150282 A1 | 10/2002 | Kinsella | | |
| 2002/0152391 A1 | 10/2002 | Willins et al. | | |
| 2002/0158750 A1 | 10/2002 | Almalik | | |
| 2002/0174348 A1* | 11/2002 | Ting | G06F 21/32 | |
| | | | 713/186 | |
| 2002/0178063 A1 | 11/2002 | Gravelle et al. | | |
| 2002/0191816 A1 | 12/2002 | Maritzen et al. | | |
| 2003/0036425 A1 | 2/2003 | Kaminkow et al. | | |
| 2003/0046552 A1 | 3/2003 | Hamid | | |
| 2003/0054868 A1 | 3/2003 | Paulsen et al. | | |
| 2003/0054881 A1 | 3/2003 | Hedrick et al. | | |
| 2003/0055689 A1* | 3/2003 | Block et al. | | 705/5 |
| 2003/0079133 A1 | 4/2003 | Breiter et al. | | |
| 2003/0115474 A1* | 6/2003 | Khan | G06F 21/32 | |
| | | | 713/186 | |
| 2003/0127511 A1 | 7/2003 | Kelly et al. | | |
| 2003/0139190 A1 | 7/2003 | Steelberg et al. | | |
| 2003/0149744 A1* | 8/2003 | Bierre | G06K 9/00885 | |
| | | | 709/217 | |
| 2003/0172037 A1* | 9/2003 | Jung | G06Q 30/06 | |
| | | | 705/64 | |
| 2003/0176218 A1 | 9/2003 | LeMay et al. | | |
| 2003/0186739 A1 | 10/2003 | Paulsen et al. | | |
| 2004/0098597 A1* | 5/2004 | Giobbi | G06F 21/10 | |
| | | | 713/185 | |
| 2004/0123127 A1* | 6/2004 | Teicher | G06F 21/78 | |
| | | | 713/193 | |
| 2004/0127277 A1 | 7/2004 | Walker et al. | | |
| 2004/0128162 A1 | 7/2004 | Schlotterbeck et al. | | |
| 2004/0129787 A1 | 7/2004 | Saito et al. | | |
| 2004/0209690 A1 | 10/2004 | Bruzzese et al. | | |
| 2004/0209692 A1 | 10/2004 | Schober et al. | | |
| 2004/0215615 A1* | 10/2004 | Larsson et al. | | 707/9 |
| 2004/0230488 A1 | 11/2004 | Beenau et al. | | |
| 2005/0001028 A1 | 1/2005 | Zuili | | |
| 2005/0006452 A1* | 1/2005 | Aupperle | A47G 29/1216 | |
| | | | 232/45 | |
| 2005/0054431 A1* | 3/2005 | Walker | G06Q 50/34 | |
| | | | 463/25 | |
| 2005/0074126 A1 | 4/2005 | Stanko | | |
| 2005/0081040 A1 | 4/2005 | Johnson et al. | | |
| 2005/0105734 A1 | 5/2005 | Buer | | |
| 2005/0108164 A1* | 5/2005 | Salafia, III | G06Q 20/04 | |
| | | | 705/42 | |
| 2005/0109836 A1* | 5/2005 | Ben-Aissa | G06K 9/00087 | |
| | | | 235/380 | |
| 2005/0138576 A1* | 6/2005 | Baumert | G06F 21/35 | |
| | | | 715/862 | |
| 2005/0215233 A1* | 9/2005 | Perera | H04W 12/06 | |
| | | | 455/411 | |
| 2005/0229007 A1 | 10/2005 | Bolle et al. | | |
| 2005/0251688 A1 | 11/2005 | Nanavati et al. | | |
| 2005/0253683 A1 | 11/2005 | Lowe | | |
| 2006/0022046 A1 | 2/2006 | Iwamura | | |
| 2006/0058102 A1* | 3/2006 | Nguyen | G07F 17/3223 | |
| | | | 463/39 | |
| 2006/0063575 A1 | 3/2006 | Gatto et al. | | |
| 2006/0076401 A1* | 4/2006 | Frerking | G06K 7/0008 | |
| | | | 235/380 | |
| 2006/0113381 A1 | 6/2006 | Hochstein et al. | | |
| 2006/0136742 A1* | 6/2006 | Giobbi | G06Q 20/12 | |
| | | | 713/185 | |
| 2006/0143441 A1* | 6/2006 | Giobbi | G06F 21/32 | |
| | | | 713/155 | |
| 2006/0156027 A1 | 7/2006 | Blake | | |
| 2007/0032288 A1 | 2/2007 | Nelson et al. | | |
| 2007/0060319 A1* | 3/2007 | Block | G07F 17/3223 | |
| | | | 463/27 | |
| 2007/0084523 A1 | 4/2007 | McLean | | |
| 2007/0112676 A1* | 5/2007 | Kontio | G06F 21/10 | |
| | | | 705/50 | |
| 2007/0159301 A1* | 7/2007 | Hirt | H04W 52/0216 | |
| | | | 340/10.1 | |
| 2007/0174809 A1* | 7/2007 | Brown | H04W 52/0216 | |
| | | | 717/100 | |
| 2007/0213048 A1* | 9/2007 | Trauberg | H04L 63/104 | |
| | | | 455/432.3 | |
| 2007/0219926 A1* | 9/2007 | Korn | G06Q 20/341 | |
| | | | 705/67 | |
| 2007/0220272 A1 | 9/2007 | Campisi et al. | | |
| 2007/0245157 A1* | 10/2007 | Giobbi | G06F 21/31 | |
| | | | 713/186 | |
| 2007/0245158 A1* | 10/2007 | Giobbi | G06F 21/31 | |
| | | | 713/186 | |
| 2008/0008359 A1* | 1/2008 | Beenau | G01D 21/00 | |
| | | | 382/117 | |
| 2008/0019578 A1 | 1/2008 | Saito et al. | | |
| 2008/0188308 A1 | 8/2008 | Shepherd et al. | | |
| 2009/0328182 A1 | 12/2009 | Malakapalli et al. | | |
| 2010/0117794 A1 | 5/2010 | Adams et al. | | |
| 2011/0126188 A1* | 5/2011 | Bernstein | G06F 11/0751 | |
| | | | 717/174 | |
| 2011/0238517 A1* | 9/2011 | Ramalingam | G06Q 20/10 | |
| | | | 705/26.1 | |

(56) References Cited

U.S. PATENT DOCUMENTS

| | | | |
|---|---|---|---|
| 2011/0307599 A1* | 12/2011 | Saretto | G06F 9/5072 709/224 |
| 2012/0226907 A1 | 9/2012 | Hohberger | |
| 2014/0074696 A1* | 3/2014 | Glaser | G06Q 20/341 705/39 |
| 2016/0210614 A1* | 7/2016 | Hall | G06F 21/35 |

FOREIGN PATENT DOCUMENTS

| | | |
|---|---|---|
| WO | WO 01/75876 A1 | 10/2001 |
| WO | WO 01/77790 A1 | 10/2001 |
| WO | WO 2005/050450 A1 | 6/2005 |
| WO | WO 2005/086802 A2 | 9/2005 |

OTHER PUBLICATIONS

Antonoff, Michael, "Visiting Video Valley," Sound & Vision, pp. 116 and 118-119, Nov. 2001.

"Applying Biometrics to Door Access," Security Magazine, Sep. 26, 2002 [online] [Retrieved on Jan. 7, 2007] Retrieved from the Internet<URL:http://www.securitymagazine.com/CDA/Articles/Technologies/3ae610eaa34d8010VgnVCM100000f932a8c0_>.

Article, "In the Age of Napster, Protecting Copyright is a Digital Arms Race," Wall Street Journal, Jul. 25, 2000.

Article, "Sound Waves Could Help Ease Web-Fraud Woes," Wall Street Journal, Aug. 14, 2000.

Blum, Jonathan, "Digital Rights Management May Solver the Napster "Problem"," Technology Investor Industrysector, (Oct. 2000), 24-27.

Debow, Credit/Debit Debuts in Midwest Smart Card Test, Computers in Banking, v6, n11, p. 10, Nov. 1989.

Dennis, Digital Passports Need Not Infringe Civil Liberties, Newsbytes, Dec. 2, 1999, 2 pages.

Fasca, Chad, "The Circuit," Electronic News, 45(45) (Nov. 8, 1999), 20.

Firecrest Shows How Truly Commercially-Minded Companies Will Exploit the Internet, Computergram International, Jan. 18, 1996.

"Frequently Asked Questions (FAQs) About BioPay," BioPay, LLC, 2007, [online] [Retrieved on Jan. 7, 2007] Retrieved from the Internet<URL:http://www.biopay.com/faqs-lowes.asp>.

Lake, Matt, "Downloading for Dollars," Sound & Vision, (Nov. 2000), 137-138.

Lewis, Sony and Visa in On-Line Entertainment Venture, New York Times, v145, Nov. 16, 1995.

McIver, R. et al., "Identification and Verification Working Together," Bioscrypt™, Aug. 27, 2004, [online] [Retrieved on Jan. 7, 2007] Retrieved from the Internet<URL:http://www.ibia.org/membersadmin/whitepapers/pdf/15/Identification%20and%20Verification%20Working%20Together.pdf>.

Nilsson, J. et al., "Match-On-Card for Java Cards," Precise Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20for%20Java%20Cards.pdf>.

Nordin, B., "Match-On-Card Technology," Precise™ Biometrics, White Paper, Apr. 2004, [online] [Retrieved on Jan. 7, 2007] Retrieved from the Internet<URL:http://www.ibia.org/membersadmin/whitepapers/pdf/17/Precise%20Match-on-Card%20technology.pdf>.

Notification of the International Search Report and Written Opinion, PCT/US04/38124, Apr. 7, 2005, 10 pages.

Paget, Paul, "The Security Behind Secure Extranets," Enterprise Systems Journal, (Dec. 1999), 4 pgs.

PCT International Search Report and Written Opinion, PCT/US05/43447, Feb. 22, 2007, 7 pages.

PCT International Search Report and Written Opinion, PCT/US05/46843, Mar. 1, 2007, 10 pages.

Press Release, "Micronas and Thomson Multimedia Showcase a New Copy Protection System that Will Drive the Future of Digital Television," www.micronas.com Jan. 8, 2002.

Press Release, "Content Protection Plan Targets Wireless Home Networks," www.eetimes.com, Jan. 11, 2002.

Press Release, "Thompson Bets on Smart Cards for Video Encryption," www.informationweek.com Jun. 7, 2001.

Press Release, "Thompson Multimedia Unveils Copy Protection Proposal Designed to Provide Additional Laye of Digital Content Security," www.thompson-multimedia.com, May 30, 2001.

"SAFModule™: A Look Into Strong Authentication," saflink Corporation, [online] [Retrieved on Jan. 7, 2007] Retrieved from the Internet<URL:http://www.ibia.org/membersadmin/whitepapers/pdf/6/SAFmod_WP.pdf>.

Sapsford, Jathon, "E-Business: Sound Waves Could Help Ease Web-Fraud Woes," Wall Street Journal, (Aug. 14, 2000), B1.

"Say Hello to Bluetooth," Bluetooth Web site, 4 pages.

"Smart Cards and Biometrics White Paper," Smart Card Alliance, May 2002, [online] [Retrieved on Jan. 7, 2007] Retrieved from the Internet<URL:http://www.securitymanagement.com/library/smartcard_faqtech0802.pdf>.

Van Winkle, William, "Bluetooth, the King of Connectivity," Laptop Buyer's Guide and Handbook, (Jan. 2000), 148-153.

Wade, W., "Using Fingerprints to Make Payments at POS Slowly Gaining Popularity," Credit Union Journal, International Biometric Group, Apr. 21, 2003, [online] [Retrieved on Jan. 7, 2007] Retrieved from the Internet<URL:http://www.biometricgroup.com/in_the_news/04.21.03.html>.

Wallace, Bob, "The Internet Unplugged," InformationWeek, 765(22), (Dec. 13, 1999), 22-24.

Weber, Thomas E., "In the Age of Napster, Protecting Copyright is a Digital Arms Race," Wall Street Journal, (Jul. 24, 2000), B1.

PCT International Search Report and Written Opinion, PCT/US07/11103, Apr. 23, 2008, 9 pages.

PCT International Search Report and Written Opinion, PCT/US07/11104, Jun. 26, 2008, 9 pages.

PCT International Search Report and Written Opinion, PCT/US07/11105, Oct. 20, 2008, 10 pages.

PCT International Search Report and Written Opinion, PCT/US07/11102, Oct. 3, 2008, 11 pages.

United States Office Action, U.S. Appl. No. 11,744,831, Sep. 3, 2010, 27 pages.

Non-Final Office Action, U.S. Appl. No. 11/314,199, Dated: Jun. 7, 2010, 13 pages.

United States Office Action, U.S. Appl. No. 11/314,199, Nov. 22, 2010, 23 pages.

Non-Final Office Action, U.S. Appl. No. 11/292,330, Dated: Sep. 16, 2010, 23 pages.

"What is a File?", Apr. 30, 1998, URL: http://unixhelp.ed.ac.uk/editors/whatisafile.html, accessed Mar. 11, 2010 via http://waybackmachine.org/19980615000000* /http://unixhelp.ed.ac.uk/editors/whatisafile.html.

Pope, Oasis Digital Signature Services: Digital Signing without the Headaches, Internet Computing—IEEE, vol. 10, 2006, pp. 81-84.

Farouk, "Authentication Mechanisms in Grid Computing Environment; Comparative Study", 2012, IEEE, p. 1-6.

Vainio, Juha., "Bluetooth Security", dated 2000, Helsinki University of Technology, p. 1-20.

Katz et al., "Smart Cards and Biometrics in Privacy-Sensitive Secure Personal Identification System", dated 2002, Smart Card Alliance, p. 1-29.

* cited by examiner

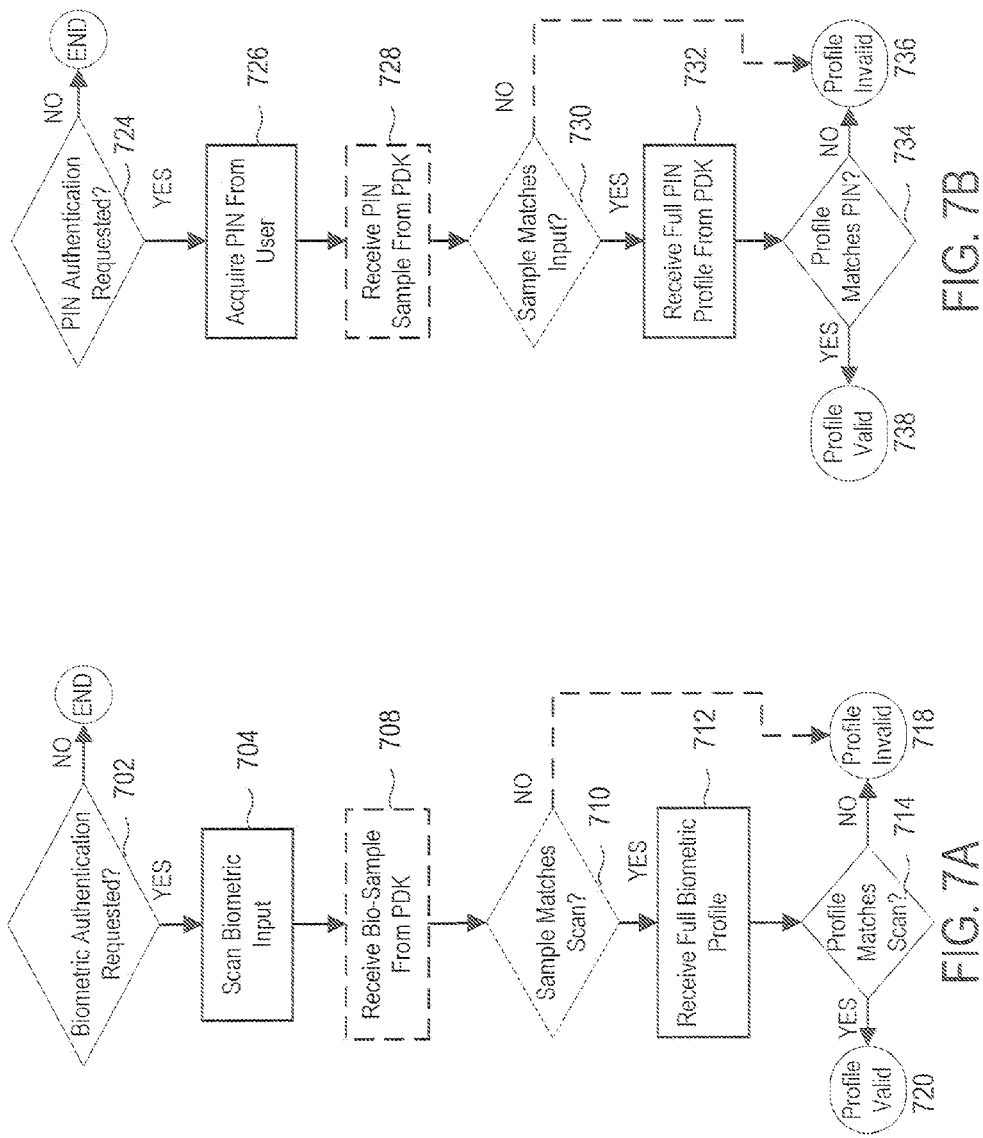

SINGLE STEP TRANSACTION AUTHENTICATION USING PROXIMITY AND BIOMETRIC INPUT

CROSS-REFERENCE TO RELATED APPLICATIONS

The present application claims the benefit of U.S. Provisional Application No. 60/798,172 entitled "Touch Pay" filed on May 5, 2006; U.S. Provisional Application No. 60/798,843 entitled "Touch Pay" filed on May 8, 2006; U.S. Provisional Application No. 60/838,788 entitled "Personal Digital Key Accessible Storage Device and Processor" filed on Aug. 17, 2006; U.S. Provisional Application No. 60/824,758 entitled "Truprox Touch Technology" filed on Sep. 6, 2006; and U.S. Provisional Application No. 60/894,608 entitled "TruProx Stored-Photo Extension" filed on Mar. 13, 2007, the entire contents of which are all herein incorporated by reference.

BACKGROUND

1. Field of Art

The invention generally relates to electronic authentication, and more specifically, to secure authentication using biometric verification.

2. Description of the Related Art

Optimizing sales transactions and providing secure access to physical and/or digital assets are challenges faced by many businesses and organizations. Ensuring these processes are safe, efficient and simple is important to merchants, providers, users and consumers alike. Conventionally, technologies such as magnetic cards (e.g., credit cards, debit cards, ATM cards, and employee badges) have been used in attempt to address these needs. More recently, various contactless cards or tokens requiring placement near compatible readers have been used.

Each of these technologies, however, has inherent problems in providing secure transaction processing and access control. In particular, the conventional technologies fail to sufficiently ensure that individuals attempting to perform a transaction are associated with the access device and are authorized to do so. Conventional attempts to address this issue include requiring users to provide Personal Identification Numbers (PINs) or passwords in conjunction with account numbers. While in some instances, these options have helped to combat fraudulent activity, these solutions add unwanted complexity and delay to transactions. With the growing need to memorize various PINs and passwords, individuals tend to repeatedly use the same, simple phrase to protect many items, or worse, keep the written phrases in their purse/wallet or next to their computer. Thus, the use of PINs and passwords are often defeated.

A technology better suited to address the issue of authenticating users is biometrics. In biometric authentication, physical and/or behavioral characteristics of an individual are analyzed to uniquely identify the individual. For example, biometric characteristics can include fingerprint, retinal, iris, face, palm, DNA, voice or signature characteristics that can each be uniquely associated with the individual. However, traditional biometric authentication solutions also suffer from significant problems. First, traditional biometric authentication techniques typically expose the participating parties to serious liabilities, risks and inefficiencies. Conventional biometric authentication techniques nearly always require users to release personal, private and unchangeable data to a controlling-entity (e.g., a merchant or business authority) or to a third-party relied upon by the controlling-entity. This exposes an individual's personal biometric information to the possibility of theft and fraudulent use. Further, controlling entities must either assume the risks and liabilities of storing this data, or trust the data to a third-party's care.

Second, conventional biometric authentication techniques generally require an individual to submit biometric information (e.g., a fingerprint, retinal scan, facial scan, or signature) for storage in a database that can then be later used for comparison with biometric data acquired at the point of transaction. This "enrollment" process is time-consuming, risky, error-prone and considered intrusive by many individuals. Further, the enrollment process must be repeated for each individual for every intended use. For example, a user may need to enroll for biometric authentication with his/her company (e.g., for secure access to facilities or digital files), and separately enroll with various merchants using biometric authentication for transactions. Thus, the individual has to spend significant time completing each separate enrollment, and additionally must trust each entity with his/her personal biometric information. For these reasons alone many individuals do not even consider these options.

The above-defined issues represent serious roadblocks to the widespread deployment and acceptance of conventional biometric authentication options. Unless the identified deficiencies are addressed, the full potential of biometric solutions will never be realized. Therefore, a new technology is needed that provides highly reliable, safe and efficient secure authentication for transaction-processing and/or access control. Moreover, the new technology should allow for a simple and efficient enrollment process that does not put an individual's highly personal information at risk of identity theft or other fraudulent use.

SUMMARY

A system and method provide efficient, secure and highly reliable authentication for transaction processing and/or access control applications. A portable physical device, referred to herein as a Personal Digital Key or "PDK", stores one or more profiles (e.g., a biometric profile) in a tamper-proof memory. The biometric profile is acquired in a secure trusted process and is uniquely associated with an individual that is authorized to use and is associated with the PDK. The PDK can wirelessly transmit the identification information including a unique PDK identification number and the biometric profile over a secure wireless channel for use in an authentication process. Additionally, the PDK can store other information such as credit/debit card information, bank information, or personal information in a memory for use in authorizing or completing a transaction.

Typically, a receiving device, referred to herein as a Reader, wirelessly receives the profile from the PDK in order to process a transaction or provide access to secure digital or physical assets. In one embodiment, the Reader acquires a biometric input from the individual carrying the PDK at the point of transaction. The biometric input can be acquired by, for example, a fingerprint scan, iris scan, retinal scan, palm scan, face scan, DNA analysis, signature analysis, voice analysis or any other input mechanism that provides physical or behavioral characteristics uniquely associated with the individual. The Reader compares the biometric profile received from the PDK to the biometric input obtained at the point of transaction to determine if a transaction should be authorized.

In one embodiment, the Reader is further adapted to communicate with one or more remote registries to provide an additional layer of security in the authentication process. Information transmitted from the PDK can be compared to entries stored in the registries to ensure the PDK (and its owner) have not participated in any fraudulent use and that the PDK is not invalid, lost or stolen. In yet another embodiment, one or more biometric authentications, remote registry authentications or other types of authentication are used in combination.

The features and advantages described in the specification are not all inclusive and in particular, many additional features and advantages will be apparent to one of ordinary skill in the art in view of the drawings, specification and claims. Moreover, it should be noted that the language used in the specification has been principally selected for readability and instructional purposes, and may not have been selected to delineate or circumscribe the inventive subject matter.

BRIEF DESCRIPTION OF THE FIGURES

FIG. 7A is a flowchart illustrating one embodiment of a process for profile testing using a biometric input.

FIG. 7B is a flowchart illustrating one embodiment of a process for profile testing using a personal identification number.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
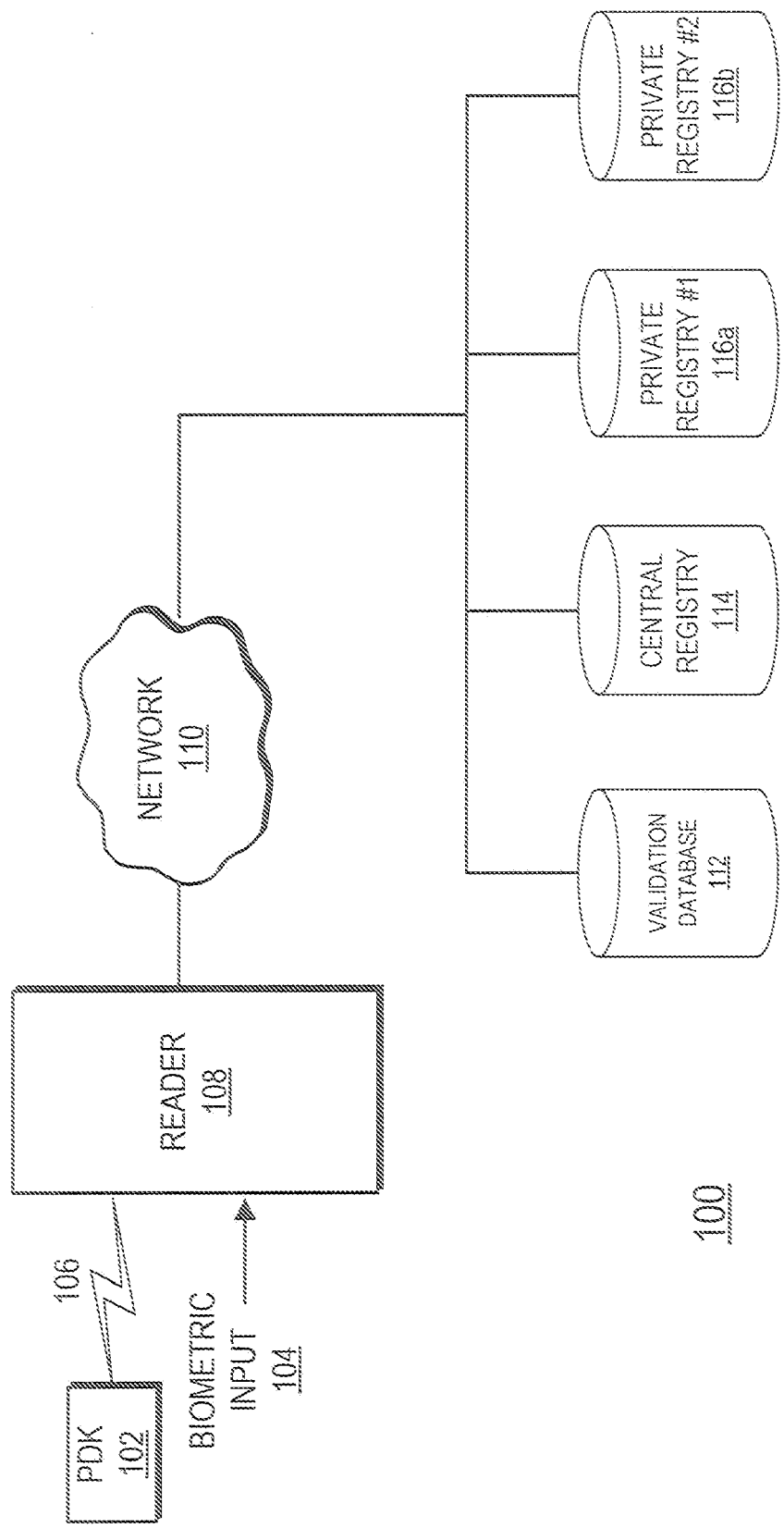
FIG. 1 is a high level block diagram illustrating a system for secure electronic authentication.

FIG. 1 is a high level block diagram illustrating a system for securely authenticating an individual for transaction-processing and/or access control applications. The system 100 comprises a Personal Digital Key (PDK) 102, a Reader 108, a network 110 and one or more external databases including a validation database 112, a Central Registry 114 and one or more private registries 116. The Reader 108 is coupled to the PDK 102 by a wireless link 106 and coupled to a network 110 by either a wired or wireless link. The Reader 108 is also adapted to receive a biometric input 104 from a user and is capable of displaying status to a user. The network 110 couples the validation database 112, the Central Registry 114 and two private registries 116 to the Reader 108. In alternative embodiments, different or additional external registries or databases may be coupled to the network 110. In another embodiment, the Reader 108 operates as a standalone device without a connection to the network 110.

The system 100 addresses applications where it is important to ensure a specific individual is authorized to perform a given transaction. A transaction as used herein can include executing a purchase or financial dealing, enabling access to physical and/or digital items, verifying identification or personal information or executing other tasks where it is important to authenticate an individual for use. Generally, the Reader 108 wirelessly receives information stored in the PDK 102 that uniquely identifies the PDK 102 and the individual carrying the PDK 102. The Reader 108 can also receive a biometric input 104 from the individual. Based on the received information, the Reader 108 determines if the transaction should be authorized. Beneficially, the system 100 provides comprehensive authentication without the need for PINs or passwords. Moreover, personal biometric information need not be stored in any local or remote storage database and is only stored on the user's own PDK. Furthermore, in one embodiment, purchase transactions can be efficiently completed without requiring the use of physical credit cards, tokens or other user action beyond initiating the transaction.

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330 entitled "Personal Digital Key And Receiver/Decoder Circuit System And Method"; U.S. patent application Ser. No. 11/620,581 entitled "Wireless Network Synchronization Of Cells And Client Devices On A Network"; and U.S. patent application Ser. No. 11/620,577 entitled "Dynamic Real-Time Tiered Client Access", the entire contents of which are all incorporated herein by reference.

To establish the trust, credibility and confidence of the authentication system, information stored in the PDK 102 is acquired by a process that is trusted, audited and easily verified. The process is ensured by a trusted third-party system, referred to herein as a Notary that administers the acquisition and storage of information in the PDK 102 according to defined security protocols. In one embodiment, the Notary is a system and/or a trusted individual that witnesses the acquisition and storage either in person or remotely. In another embodiment, the Notary comprises trusted hardware that administers the initialization process by an automated system. Thus, once initialized by the trusted process, the PDK 102 can prove that the information it stores is that of the individual. Example embodiments of the initialization process are described in U.S. patent application Ser. No. 11/744,832, entitled "Personal Digital Key Initialization and Registration For Secure Transaction", the entire contents of which are incorporated herein by reference.

The Reader 108 wirelessly communicates with the PDK 102 when the PDK 102 is within a proximity zone of the Reader 108. The proximity zone can be, for example, several meters in radius and can be adjusted dynamically by the Reader 108. Example embodiments of a Reader with a dynamically adjustable proximity zone are described in U.S. patent application Ser. No. 11/620,600, filed Jan. 5, 2007, entitled "Dynamic Cell Size Variation Via Wireless Link Parameter Adjustment", the entire contents of which are incorporated herein by reference. Thus, in contrast to many conventional RF ID devices, the Reader 108 can detect and communicate with the PDK 102 without requiring the owner to remove the PDK 102 from his/her pocket, wallet, purse, etc. Also, in contrast to many conventional RFD) devices, the Reader 108 and PDK 102 are designed to operate in a dense client environment—not on a one-by-one reader to client-held device basis. Example embodiments of a Reader that provides dense, coordinated system operation is described in U.S. patent application Ser. No. 11/620,581, filed Jan. 5, 2007, entitled "Wireless Network Synchronization Of Cells And Client Devices On A Network", the entire contents of which are incorporated herein by reference. Generally, the Reader 108 receives uniquely identifying information from the PDK 102 and initiates an authentication process for the individual carrying the PDK 102. In one embodiment, the Reader 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The Reader 108 compares the biometric input 104 to information received from the PDK 102 to determine if a transaction should be authorized. Alternatively, the biometric input 104 can be obtained by a biometric reader on the PDK 102 and transmitted to the Reader 108 for authentication. In additional alternative embodiment, some or all of the authentication process can be performed by the PDK 102 instead of the Reader 108.

The Reader 108 is further communicatively coupled to the network 110 in order to receive and/or transmit information to remote databases for remote authentication. In an alternative embodiment, the Reader 108 includes a non-volatile data storage that can be synchronized with one or more remote databases 112 or registries 114-116. Such an embodiment relaxes the requirement for a continuous connection to the network 110 and allows the Reader 108 to operate in a standalone mode and for the local data storage to be updated when a connection is available. For example, a standalone Reader 108 can periodically download updated registry entries and perform authentication locally without any remote lookup.

The network 110 provides communication between the Reader 108 and the validation database 112, Central Registry 114 and one or more private registries 116. In alternative embodiments, one or more of these connections may not be present or different or additional network connections may be present. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The validation database 112 stores additional information that may be used for authorizing a transaction to be processed at the Reader 108. For example, in purchase transactions, the validation database 112 is a credit card validation database that is separate from the merchant providing the sale. Alternatively, a different database may be used to validate different types of purchasing means such as a debit card, ATM card or bank account number.

The registries 114-116 are securely-accessible databases coupled to the network 110 that store, among other items, PDK, Notary, and Reader information. In one embodiment, the registries 114-116 do not store biometric information. Information stored in the registries can be accessed by the Reader 108 via the network 110 for use in the authentication process. There are two basic types of registries illustrated: private registries 116 and the Central Registry 114. Private registries 116 are generally established and administered by their controlling entities (e.g., a merchant, business authority, or other entity administering authentication). Private registries 116 can be custom configured to meet the specialized and independent needs of each controlling entity. The Central Registry 114 is a single highly-secured, centrally-located database administered by a trusted third-party organization. In one embodiment, all PDKs 102 are registered with the Central Registry 114 and may be optionally registered with one or more selected private registries 116. In alternative embodiments, a different number or different types of registries may be coupled to the network 110.

Figure 2:
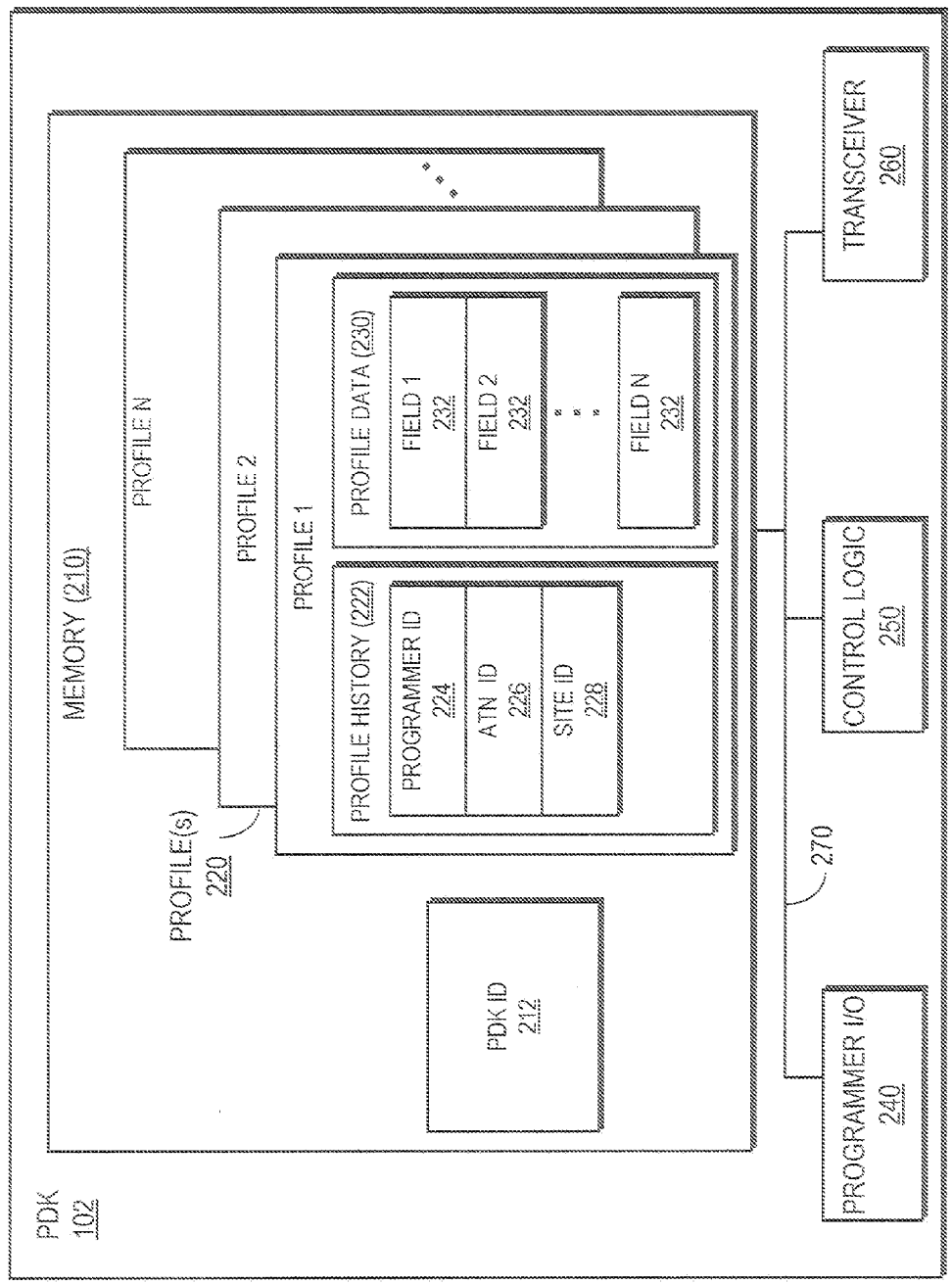
FIG. 2 is a block diagram illustrating one embodiment of a Personal Digital Key (PDK).

Turning now to FIG. 2, an example embodiment of a PDK 102 is illustrated. The PDK 102 comprises a memory 210, a programmer I/O 240, control logic 250, and a transceiver 260, coupled by a bus 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, or jewelry items such as watches, rings, necklaces or bracelets.

The memory 210 can be a read-only memory, a once-programmable memory, a read/write memory or any combination of memory types including physical access secured and tamperproof memories. The memory 210 typically stores a unique PDK ID 212 and one or more profiles 220. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private 116 or Central 114 registry entries. The PDK ID 212 can also be used in basic PDK authentication to ensure that the PDK 102 is a valid device.

The profile fields 220 can be initially empty at the time of manufacture but can be written to by authorized individuals (e.g., a Notary) and/or hardware (e.g., a Programmer). In one embodiment, each profile 220 comprises a profile history 222 and profile data 230. Many different types of profiles 220 are possible. A biometric profile, for example, includes profile data 230 representing physical and/or behavioral information that can uniquely identify the PDK owner. A PDK 102 can store multiple biometric profiles, each comprising a different type of biometric information. In one embodiment, the biometric profile 220 comprises biometric information transformed by a mathematical operation, algorithm, or hash that represents the complete biometric information (e.g., a complete fingerprint scan). In one embodiment, a mathematical hash is a "one-way" operation such that there is no practical way to re-compute or recover the complete biometric information from the biometric profile. This both reduces the amount of data to be stored and adds an additional layer of protection to the user's personal biometric information. In one embodiment, the PDK 102 also stores one or more biometric profile "samples" associated with each biometric profile. The biometric profile sample is a subset of the complete profile that can be used for quick comparisons of biometric data. In one embodiment, the profile samples can be transmitted over a public communication channel or transmitted with a reduced level of encryption while the full biometric profiles are only transmitted over secure channels. In the case of fingerprint authentication, for example, the biometric profile sample may represent only a small portion area of the full fingerprint image. In another embodiment, the fingerprint profile sample is data that describes an arc of one or more lines of the fingerprint. In yet another embodiment, the fingerprint profile sample can be data representing color information of the fingerprint.

In another embodiment, the stored profiles 220 include a PIN profile that stores one or more PINs or passwords associated with the PDK owner. Here, the number or password stored in the PIN profile can be compared against an input provided by the user at the point of transaction to authenticate the user. In one embodiment, a PIN profile sample is also stored with the PIN profile that comprises a subset of the full PIN. For example, a PIN profile sample can be only the first two numbers of the PIN that can be used to quickly compare the stored PIN profile to a PIN obtained at the point of transaction.

In yet another embodiment, the PDK 102 stores a picture profile that includes one or more pictures of the PDK owner. In a picture profile authentication, the picture stored in the PDK 102 is transmitted to a display at the point of transaction to allow an administrator (e.g., a clerk or security guard) to confirm or reject the identity of the individual requesting the transaction. In another embodiment, an image is captured of the individual at the point of transaction and compared to the picture profile by an automated image analysis means. Furthermore, picture profiles could be used along with other personal identification information, for example, in place of conventional passports or drivers licenses to authenticate the identity of an individual and allow for remote identification of individuals. For example, a police officer following a vehicle could obtain an image and identity of the driver while still maintaining a safe distance from the vehicle. In the hospitality industry, a host could greet a guest at the door of a hotel, casino or restaurant and easily recognize the guest by obtaining the guest's picture profile as he/she enters.

A registry or database profile typically stores information associating the user with a registry. The registry profile can be used to determine if the individual is associated with the controlling entity for that registry and if different types of transactions are authorized for the individual. A registry profile can further include additional user information for use with the registry. For example, a private registry profile associated with a particular merchant may include a credit card number that the user has selected as a default for that merchant. In one embodiment, a profile can further include spending limits that limits the amount of purchases a user can make with a particular vendor or using a particular profile.

A profile can further include personal identification information such as name, address, phone number, etc., bank information, credit/debit card information, or membership information. This information can be useful for certain types of transactions. For example, with purchases that require delivery, a PDK 102 can automatically transmit address information to the Reader 108 at the point of transaction. In one embodiment, a profile can store multiple addresses. At the point of transaction, the Reader 108 displays the address options and allows the user to select which address to use.

Generally, some types of profile information (e.g., a biometric profile) can only be acquired during a trusted initialization process that is administered by a trusted Notary. In one embodiment, other secure information such as credit card information is also stored to the PDK in the presence of a Notary. Alternatively, certain types of low-risk information can be added by the user without a Notary, such as, for example a change of address. In another embodiment, once an initial profile has been stored to the PDK 102, a user can add information to the PDK 102 using a Programmer without a Notary through self-authentication. For example, in one embodiment, a PDK 102 that has a stored biometric profile can be "unlocked" by providing a matching biometric input. Then, once unlocked, the user can add additional profiles, credit cards, personal information, etc. to the PDK 102. In another embodiment, the user can make copies of the PDK 102 or move profiles from one PDK 102 to another once the PDK 102 is unlocked.

The profile history 222 includes a programmer ID field 224, a Notary ID 226, and a site ID field 228. The profile history 222 relates to the specific hardware, Notary, and site used at the time the profile data was created and stored to the PDK. Typically each profile 220 stores its specific profile history 222 along with the profile data 230. The profile history 222 can be recalled for auditing purposes at a later time to ensure the credibility of the stored data. In one embodiment, transaction history can also be stored to the PDK memory 210. Here, the PDK 102 stores information associated with any transactions made with the PDK 102 such as the name of the merchant, the purchase amount, credit card used, etc.

The PDK 102 also includes a programmer I/O 240 that provides an interface to a trusted Programmer (not shown). The Programmer comprises trusted hardware that is used to program the memory 210 of the PDK 102. An example embodiment of a Programmer is described in U.S. patent application Ser. No. 11/744,832 entitled "Personal Digital Key Initialization and Registration For Secure Transaction", the entire contents of which are incorporated herein by reference. The programmer I/O 240 can be, for example, a USB interface, serial interface, parallel interface, or any other direct or wireless link for transferring information between the PDK 102 and the Programmer. When coupled to the Programmer, the programmer I/O 240 receives initialization data, registration data or other information to be stored in the memory 210.

The control logic 250 coordinates between functions of the PDK 102. In one embodiment, the control logic 250 facilitates the flow of information between the programmer I/O 240, transceiver 260 and memory 210. The control logic 250 can further process data received from the memories 210, programmer I/O 240 and transceiver 260. Note that the control logic 250 is merely a grouping of control functions in a central architecture, and in other embodiments, the control functions can be distributed between the different modules of the PDK 102. The operation of the control logic will be understood to those skilled in the art based on the description below corresponding to FIGS. 4-7D.

The transceiver 260 is a wireless transmitter and receiver for wirelessly communicating with a Reader 108 or other wireless device. The transceiver 260 can send and receive data as modulated electromagnetic signals. Moreover, the data can be encrypted by the transceiver 260 and transmitted over a secure link. Further, the transceiver 260 can actively send connection requests, or can passively detect connection requests from another wireless source. In one embodiment, the transceiver 260 is used in place of a separate programmer I/O 240 and is used to wirelessly communicate with the Programmer for programming. In one embodiment, the transceiver 260 is adapted to communicate over a range of up to around 5 meters.

Optionally, a PDK 102 can also include a built in biometric reader (not shown) to acquire a biometric input from the user. The biometric input can be used to unlock the PDK 102 for profile updates, or for various types of authentication. For example, in one embodiment, a biometric input is received by the PDK 102 and compared to stored biometric information. Then, if the user is authenticated, the PDK 102 can indicate to the Reader 108 that the user is authenticated and transmit additional information (e.g., a credit card number) needed to complete a transaction.

Figure 3:
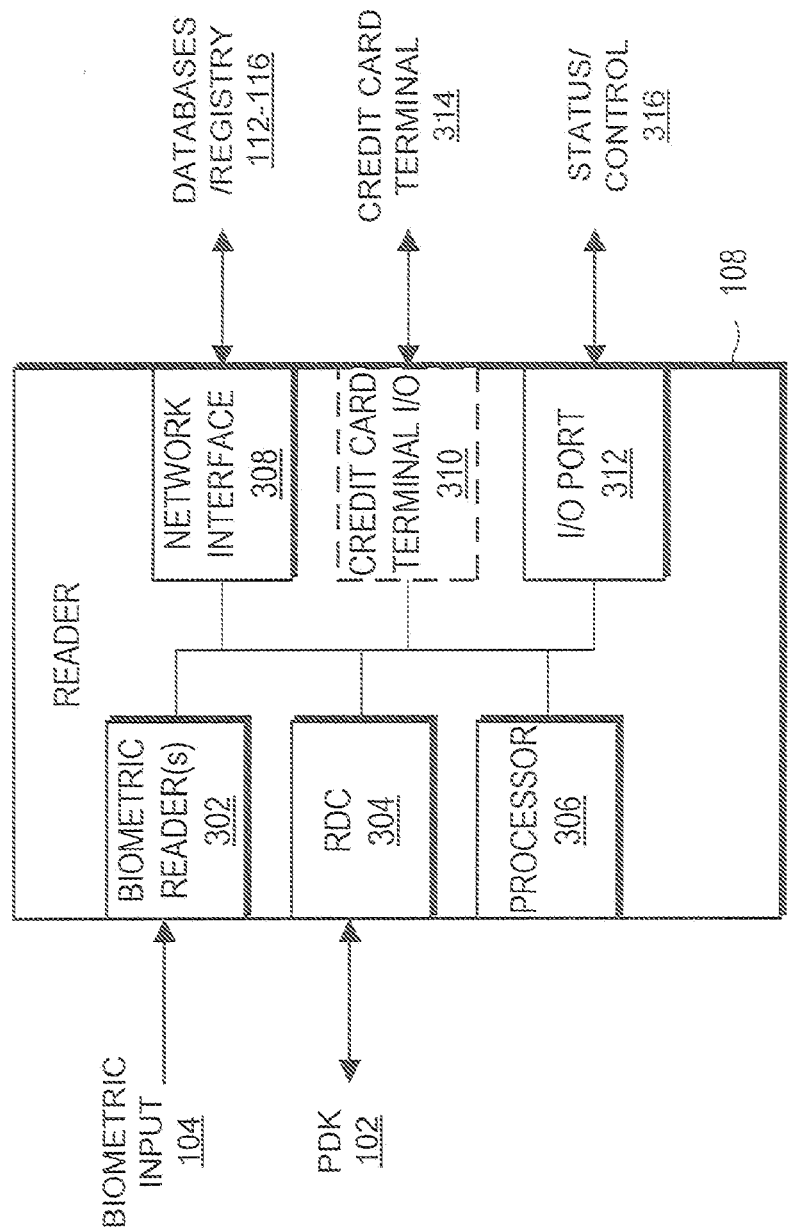
FIG. 3 is a block diagram illustrating one embodiment of a Reader.

Turning now to FIG. 3, an example embodiment of a Reader 108 is illustrated. The embodiment includes one or more biometric readers 302, a receiver-decoder circuit (RDC) 304, a processor 306, a network interface 308, an I/O port 312 and optionally a credit card terminal I/O 310. In alternative embodiments, different or additional modules can be included in the Reader 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method", the entire contents of which are incorporated herein by reference. Encrypting data transmitted between the PDK 102 and Reader 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual at the point of transaction. In one embodiment, the biometric reader 302 is a fingerprint scanner. Here, the biometric reader 302 includes an image capture device adapted to capture the unique pattern of ridges and valleys in a fingerprint also known as minutiae. Other embodiments of biometric readers 302 include retinal scanners, iris scanners, facial scanner, palm scanners, DNA/RNA analyzers, signature analyzers, cameras, microphones, and voice analyzers. Furthermore, the Reader 108 can include multiple biometric readers 302 of different types. In one embodiment, the biometric reader 302 automatically computes mathematical representations or hashes of the scanned data that can be compared to the mathematically processed biometric profile information stored in the PDK 102.

The processor 306 can be any general-purpose processor for implementing a number of processing tasks. Generally, the processor 306 processes data received by the Reader 108 or data to be transmitted by the Reader 108. For example, a biometric input 104 received by the biometric reader 302 can be processed and compared to the biometric profile 220 received from the PDK 102 in order to determine if a transaction should be authorized. In different embodiments, processing tasks can be performed within each individual module or can be distributed between local processors and a central processor. The processor 306 further includes a working memory for use in various processes such as performing the method of FIGS. 4-7D.

The network interface 308 is a wired or wireless communication link between the Reader 108 and one or more external databases such as, for example, a validation database 112, the Central Registry 114 or a private registry 116. For example, in one type of authentication, information is received from the PDK 102 at the RDC 304, processed by the processor 306, and transmitted to an external database 112-116 through the network interface 308. The network interface 308 can also receive data sent through the network 110 for local processing by the Reader 108. In one embodiment, the network interface 308 provides a connection to a remote system administrator to configure the Reader 108 according to various control settings.

The I/O port 312 provides a general input and output interface to the Reader 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

The credit card terminal I/O 310 optionally provides an interface to an existing credit card terminal 314. In embodiments including the credit card terminal I/O 310, the Reader 108 supplements existing hardware and acts in conjunction with a conventional credit card terminal 314. In an alternative embodiment, the functions of an external credit card terminal 314 are instead built into the Reader 108. Here, a Reader 108 can completely replace an existing credit card terminal 314.

In one embodiment, a Reader 108 is adapted to detect and prevent fraudulent use of PDKs that are lost, stolen, revoked, expired or otherwise invalid. For example, the Reader 108 can download lists of invalid PDKs 102 from a remote database and block these PDKs 102 from use with the Reader 108. Furthermore, in one embodiment, the Reader 108 can update the blocked list and/or send updates to remote registries 114-116 or remote Readers 108 upon detecting a fraudulently used PDK 102. For example, if a biometric input 104 is received by the Reader 108 that does not match the biometric profile received from the PDK 102, the Reader 108 can obtain the PDK ID 212 and add it to a list of blocked PDKs. In another embodiment, upon detecting fraudulent use, the Reader 108 can send a signal to the PDK 102 that instructs the PDK 102 to deactivate itself. The deactivation period can be, for example, a fixed period of time, or until the rightful owner requests re-activation of the PDK 102. In yet another embodiment, the Reader 108 can send a signal instructing the fraudulently obtained PDK 102 to send beacon signals indicating that the PDK 102 is a stolen device. Here, a stolen PDK 102 can be tracked, located and recovered by monitoring the beacon signals. In one embodiment, the Reader 108 stores biometric or other identifying information from an individual that attempts to fraudulently use a PDK 102 so that the individual's identity can be determined.

Generally, the Reader 108 is configured to implement at least one type of authentication prior to enabling a transaction. In many cases, multiple layers of authentication are used. A first layer of authentication, referred to herein as "device authentication", begins any time a PDK 102 moves within range of a Reader 108. In device authentication, the Reader 108 and the PDK 102 each ensure that the other is valid based on the device characteristics, independent of any profiles stored in the PDK 102. In some configurations, when fast and simple authentication is desirable, only device authentication is required to initiate the transaction. For example, a Reader 108 may be configured to use only device authentication for low cost purchases under a predefined amount (e.g., $25). The configuration is also useful in other types of low risk transactions where speed is preferred over additional layers of authentication.

Other configurations of the Reader 108 require one or more additional layers of authentication, referred to herein as "profile authentication" based on one or more profiles stored in the PDK 102. Profile authentication can include, for example, a biometric authentication, a PIN authentication, a photo authentication, a registry authentication, etc. or any combination of the above authentication types. Profile authentications are useful when a more exhaustive authentication process is desired, for example, for high purchase transactions or for enabling access to classified assets.

Figure 4:
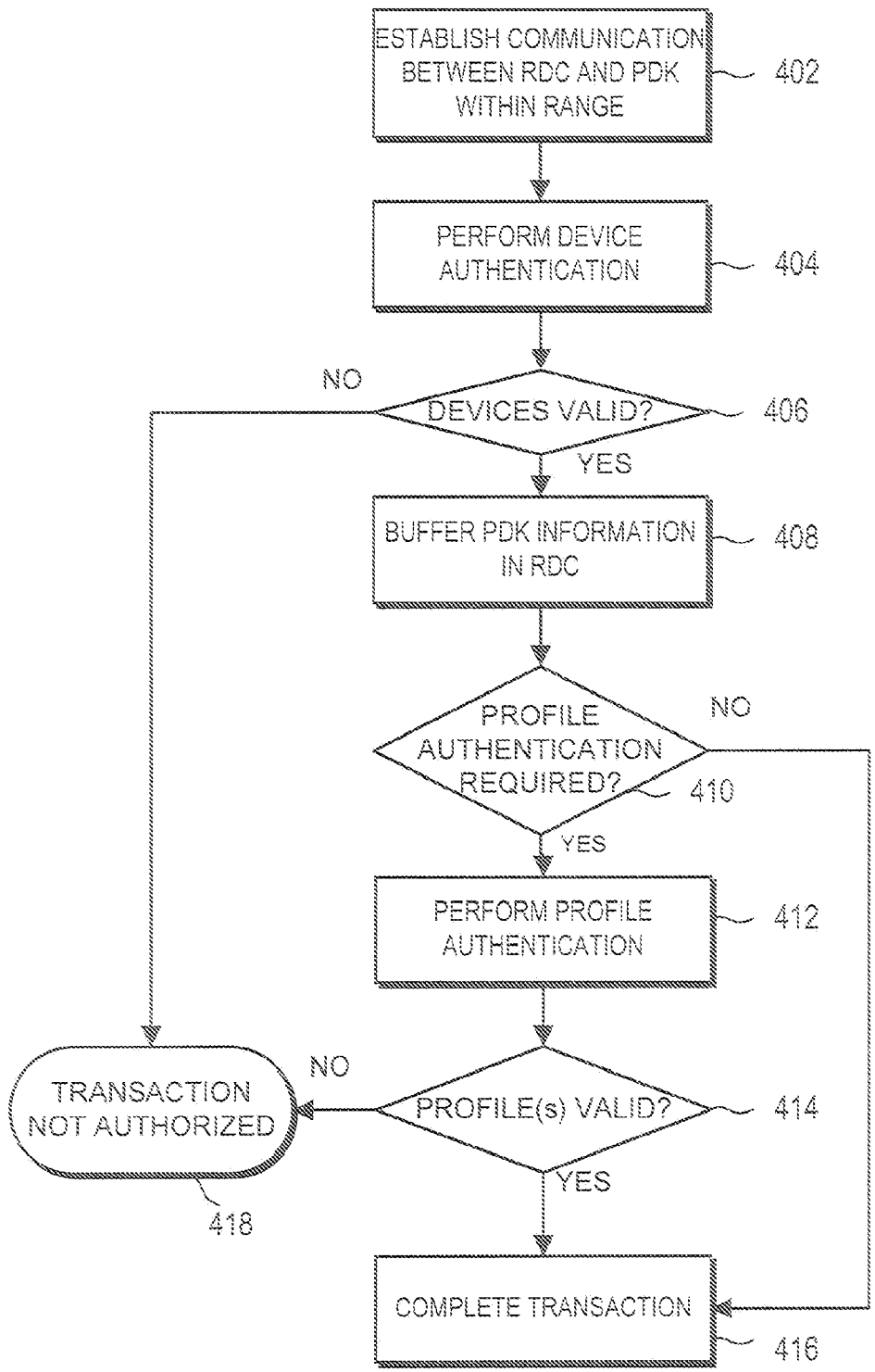
FIG. 4 is a flowchart illustrating one embodiment of a process for authorizing a transaction using secure authentication.

FIG. 4 illustrates an example embodiment of a process for secure authentication of a transaction. When a PDK 102 comes within range of a Reader 108, communication is automatically established 402 between the RDC 304 of the Reader 108 and the PDK 102. In one embodiment, the RDC 304 continually transmits beacons that are detected by the PDK 102 when it enters a proximity zone of the Reader 108. In an alternative embodiment, the communication is instead initiated by the PDK 102 and acknowledged by the Reader 108. Generally, initial communication between the Reader 108 and the PDK 102 is not encrypted in order to provide faster and more power efficient communication.

In step 404, a device authentication is performed. Here, the Reader 108 establishes if the PDK 102 is a valid device and PDK 102 establishes if the Reader 108 is valid. Furthermore, device authentication determines if the PDK is capable of providing the type of authentication required by the Reader 108.

Figure 5:
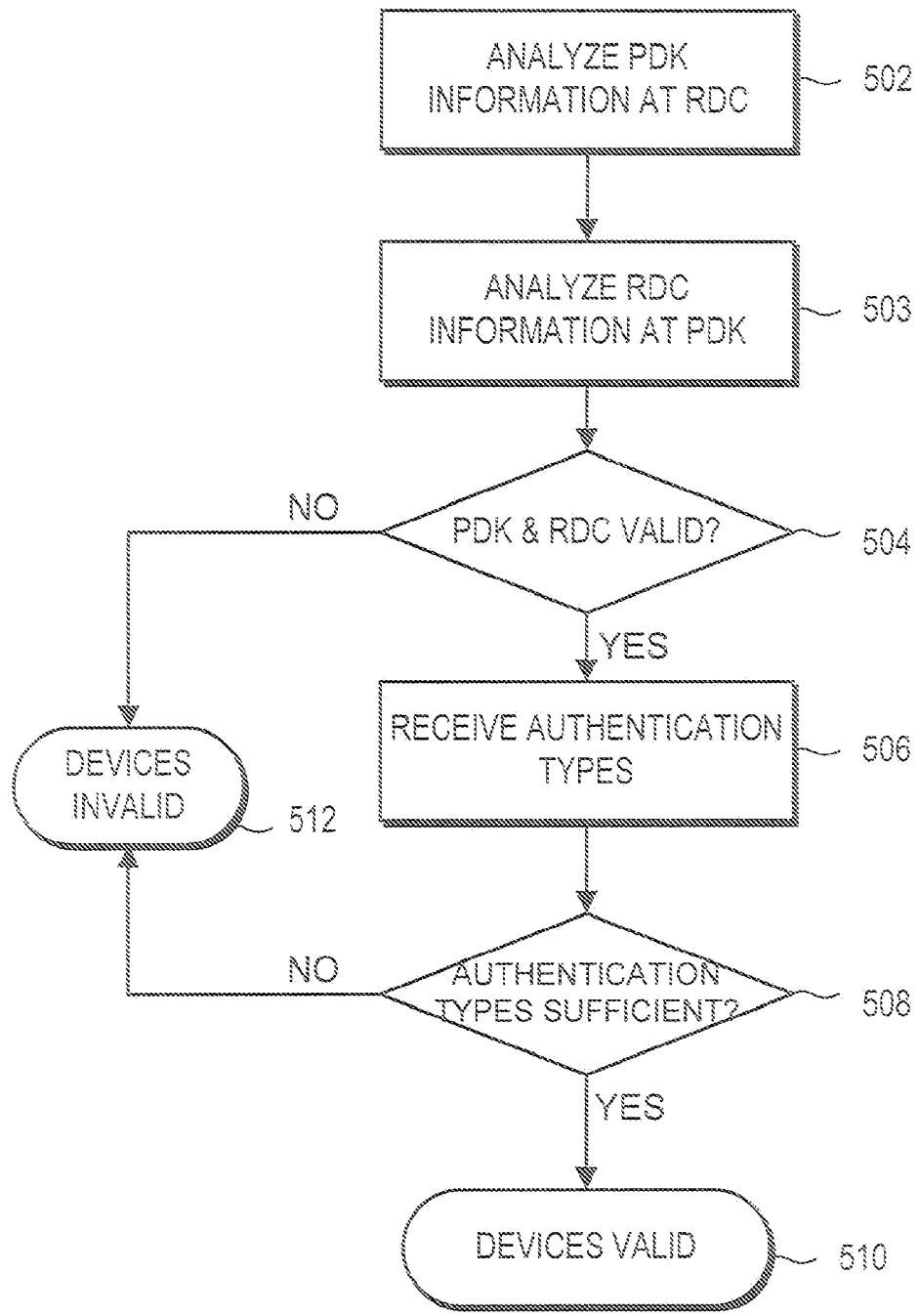
FIG. 5 is a flowchart illustrating one embodiment of a process for device authentication by a Reader.

An example embodiment of a method for performing 404 device authentication is illustrated in FIG. 5. The RDC 304 receives and analyzes 502 information from the PDK 102; and the PDK 102 receives and analyzes 502 information received from the RDC 304. Generally, this initial information is transmitted over a public communication channel in an unencrypted format. Based on the received information, each device 102, 304 determines 504 if the other is valid. As will be apparent to one of ordinary skill in the art, a number of different protocols can be used for this type of authentication such as, for example, a challenge-response authentication or a challenge handshake authentication protocol (CHAP). If either of the devices 102, 304 is invalid 512, the process ends. If both the PDK 102 and the RDC 304 are determined by the other to be valid, the Reader 108 requests and receives 506 authentication type information from the PDK 102 indicating the different types of authentication the PDK 102 is capable of satisfying based on the types of profiles the PDK 102 stores. The available profile types in the PDK 102 are compared against the authentication types that can be used by the Reader 108. For example, a particular Reader 108 may be configured to perform only a fingerprint authentication and therefore any PDK without a fingerprint biometric profile cannot be used with the Reader 108. In one embodiment, the Reader 108 can allow more than one type of profile to be used. In another embodiment, the Reader 108 requires more than one type of profile for authentication, while in yet further embodiments no profile authentications are required. Next, the method determines 508 whether the PDK 102 has one or more profiles sufficient for authentication. If the PDK 102 does not have one or more profiles sufficient for authentication with the Reader 108, the devices 102, 304 are determined to be invalid 512 because they cannot be used with each other. If the PDK 102 does have one or more sufficient types of profiles, the devices are valid 510.

Turning back to FIG. 4, if either the PDK 102 or RDC 304 is not found valid during device authentication 404, the transaction is not authorized 418 and the process ends. If the devices are valid, the RDC 304 temporarily buffers 408 the received PDK information. It is noted that in one embodiment, steps 402-408 are automatically initiated each time a PDK 102 enters the proximity zone of the Reader 108. Thus, if multiple PDKs 102 enter the proximity zone, the Reader 108 automatically determines which PDKs 102 are valid and buffers the received information from each valid PDK 102.

The method next determines 410 whether profile authentication is required based on the configuration of the Reader 108, the type of transaction desired or by request of a merchant or other administrator. If the Reader 108 configuration does not require a profile authentication in addition to the PDK authentication, then the Reader 108 proceeds to complete the transaction for the PDK 102. If the Reader 108 does require profile authentication, the profile authentication is performed 412 as will be described below with references to FIGS. 6-7D. If a required profile is determined 414 to be valid, the Reader 108 completes 416 the transaction. Otherwise, the Reader 108 indicates that the transaction is not authorized 418. In one embodiment, completing 416 the transaction includes enabling access to secure physical or digital assets (e.g., unlocking a door, opening a vault, providing access to a secured hard drive, etc.). In another embodiment, completing 416 the transaction includes charging a credit card for a purchase. Alternatively, bank information, debit/check/ATM card information, coupon codes, or any other purchasing means information (typically stored in a profile memory field 232) can be transmitted by the PDK 102 in place of credit card information. In one embodiment, the PDK 102 is configured with multiple purchasing means and a default is configured for different types of transactions. In another embodiment, each credit card or other purchasing means is displayed to the customer by the Reader 108 and the customer is allowed to select which to use for the transaction.

Figure 6:
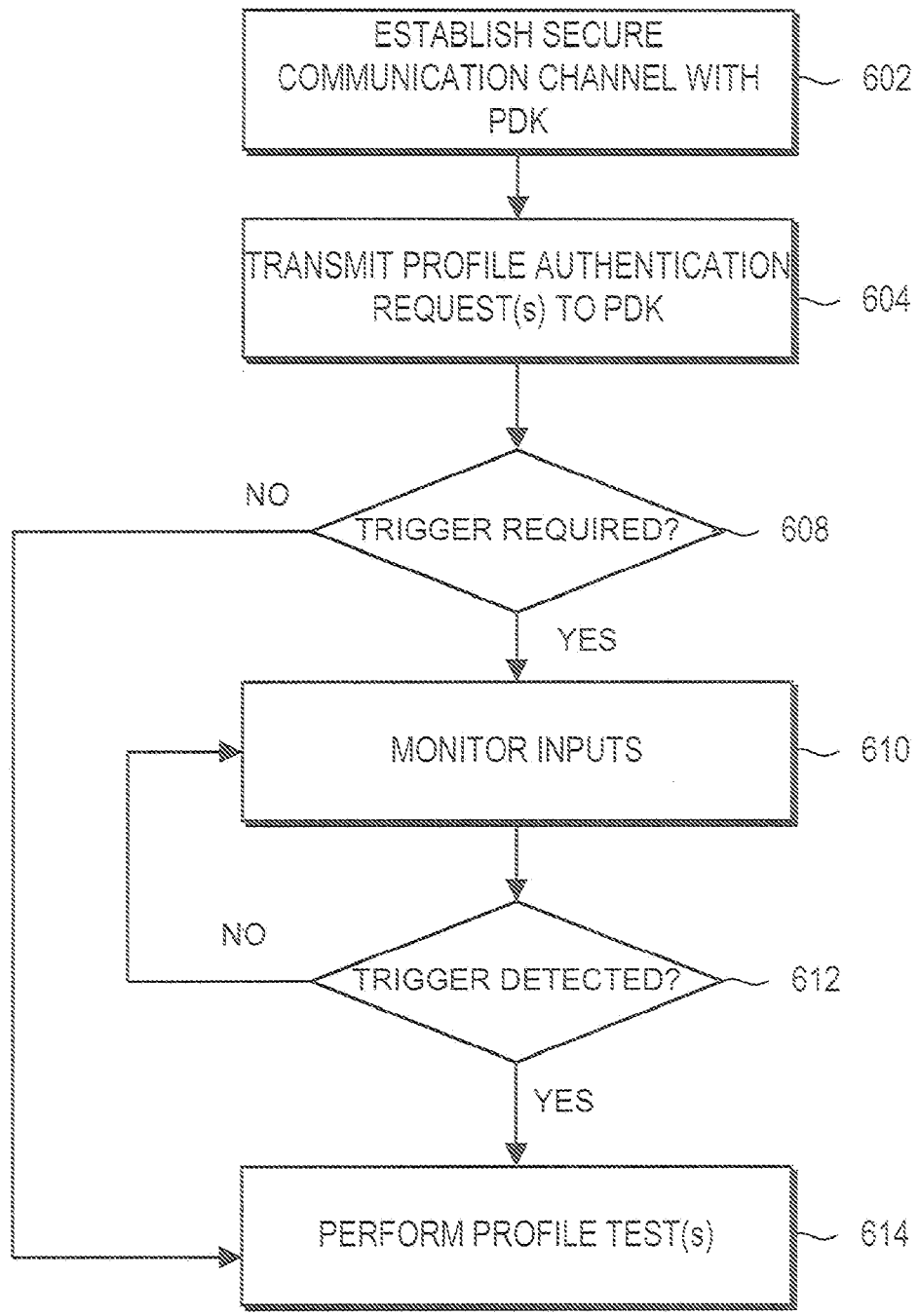
FIG. 6 is a flowchart illustrating one embodiment of a process for profile authentication by a Reader.

Turning now to FIG. 6, an embodiment of a process for profile authentication is illustrated. In step 602, a secure communication channel is established between the RDC 304 and the PDK 102. Information sent and received over the secure channel is in an encrypted format that cannot be practically decoded, retransmitted, reused, or replayed to achieve valid responses by an eavesdropping device. The Reader 108 transmits 604 profile authentication requests to the PDK 102 requesting transmission of one or more stored profiles over the secure channel. At 608, the process determines whether a "trigger" is required for authentication. The requirement for a trigger depends on the configuration of the Reader 108, the specific type of transaction to be executed and the type of authentication requested.

In a first configuration, a trigger is required to continue the process because of the type of authentication being used. For example, in biometric authentication, the authentication process cannot continue until the Reader detects a biometric contact and receives biometric information. It is noted that biometric contact is not limited to physical contact and can be, for example, the touch of a finger to a fingerprint scanner, the positioning of a face in front of a facial or retinal scanner, the receipt of a signature, the detection of a voice, the receipt of a DNA sample, RNA sample, or derivatives or any other action that permits the Reader 108 to begin acquiring the biometric input 104. By supplying the biometric contact, the user indicates that the authentication and transaction process should proceed. For example, a PDK holder that wants to make a withdrawal from an Automated Teller Machine (ATM) equipped with a Reader 108 initiates the withdrawal by touching a finger to the Reader 108. The ATM then begins the transaction process for the withdrawal.

In a second configuration, some other user action is required as a trigger to proceed with the transaction even if the authentication process itself doesn't necessarily require any input. This can be used for many purchasing transactions to ensure that the purchase is not executed until intent to purchase is clear. For example, a Reader 108 at a gas station can be configured to trigger the transaction when a customer begins dispensing gas. At a supermarket, a Reader 108 can be configured to trigger the transaction when items are scanned at a checkout counter.

In a third configuration, no trigger is used and the Reader 108 automatically completes the remaining authentication/transaction with no explicit action by the user. This configuration is appropriate in situations where the mere presence of a PDK 102 within range of the Reader 108 is by itself a clear indication of the PDK owner's desire to complete a transaction. For example, a Reader 108 can be positioned inside the entrance to a venue hosting an event (e.g., a sporting event, a concert, or a movie). When a PDK owner walks through the entrance, the Reader 108 detects the PDK 102 within range, authenticates the user, and executes a transaction to purchase an electronic ticket for the event. In another embodiment, the electronic ticket can be purchased in advance, and the Reader 108 can confirm that the user is a ticket holder upon entering the venue. Other examples scenarios where this configuration is useful include boarding a transportation vehicle (e.g., a train, bus, airplane or boat), entering a hotel room, or accessing secure facilities or other assets. Thus, if no trigger is required, the process next performs 614 the requested profile authentication tests.

If a trigger is required, the Reader monitors 610 its inputs (e.g., a biometric reader, key pad, etc.) and checks for the detection 612 of a trigger. If the required trigger is detected, the process continues to perform 614 one or more profile authentication test. FIGS. 7A-7D illustrate various embodiments of profile authentication tests. According to different configurations of the Reader 108, one or more of the illustrated authentication processes may be used. Further, in some embodiments, one or more of the processes may be repeated (e.g., for different types of biometric inputs).

Referring first to FIG. 7A, it illustrates a process for biometric authentication. In biometric authentication, a Reader 108 compares a biometric profile stored in the PDK 102 to the biometric input 104 acquired by the biometric reader 302. Advantageously, the biometric input 104 is not persistently stored by the Reader 108, reducing the risk of theft or fraudulent use. If 702 biometric authentication is requested, the Reader 108 scans 704 the biometric input 104 supplied by the user. In one embodiment, scanning 704 includes computing a mathematical representation or hash of the biometric input 104 that can be directly compared to the biometric profile.

Furthermore, in one embodiment, scanning 704 also includes obtaining a biometric input sample from the biometric input according to the same function used to compute the biometric profile sample stored in the PDK 102. Optionally, the Reader 108 receives 708 a biometric profile sample from the PDK 102 and determines 710 if the biometric profile sample matches the biometric input sample. If the biometric profile sample does not match the input sample computed from the scan, the profile is determined to be invalid 718. If the biometric profile sample matches, the full biometric profile 712 is received from the PDK 102 to determine 714 if the full biometric profile 712 matches the complete biometric input 104. If the profile 712 matches the scan, the profile 712 is determined to be valid 720, otherwise the profile 712 is invalid 718. It is noted that in one embodiment, steps 708 and 710 are skipped and only a full comparison is performed.

It will be apparent to one of ordinary skill that in alternative embodiments, some of the steps in the biometric profile authentication process can be performed by the PDK 102 instead of the Reader 108 or by an external system coupled to the Reader 108. For example, in one embodiment, the biometric input 104 can be scanned 704 using a biometric reader built into the PDK 102. Furthermore, in one embodiment, the steps of computing the mathematical representation or hash of the biometric input and/or the steps of comparing the biometric input to the biometric profile can be performed by the PDK 102, by the Reader 108, by an external system coupled to the Reader 108, or by any combination of the devices. In one embodiment, at least some of the information is transmitted back and forth between the PDK 102 and the Reader 108 throughout the authentication process. For example, the biometric input 104 can be acquired by the PDK 102, and transmitted to the Reader 108, altered by the Reader 108, and sent back to the PDK 102 for comparison. Other variations of information exchange and processing are possible without departing from the scope of the invention. The transfer of data between the PDK 102 and the Reader 108 and/or sharing of processing can provide can further contribute to ensuring the legitimacy of each device.

FIG. 7B illustrates a process for PIN authentication. If PIN authentication is requested 724, a PIN is acquired 726 from the user through a keypad, mouse, touch screen or other input mechanism. Optionally, the Reader 108 receives 728 a PIN sample from the PDK 102 comprising a subset of data from the full PIN. For example, the PIN sample can comprise the first and last digits of the PIN. If the Reader 108 determines 730 that the PIN sample does not match the input, the profile is immediately determined to be invalid 736. If the PIN sample matches, the full PIN profile is received 732 from the PDK and compared to the input. If the Reader 108 determines 734 that the profile matches the input, the profile is determined to be valid and is otherwise invalid 736. It is noted that in one embodiment, steps 728 and 730 are skipped.

Figures 7C, 7D:
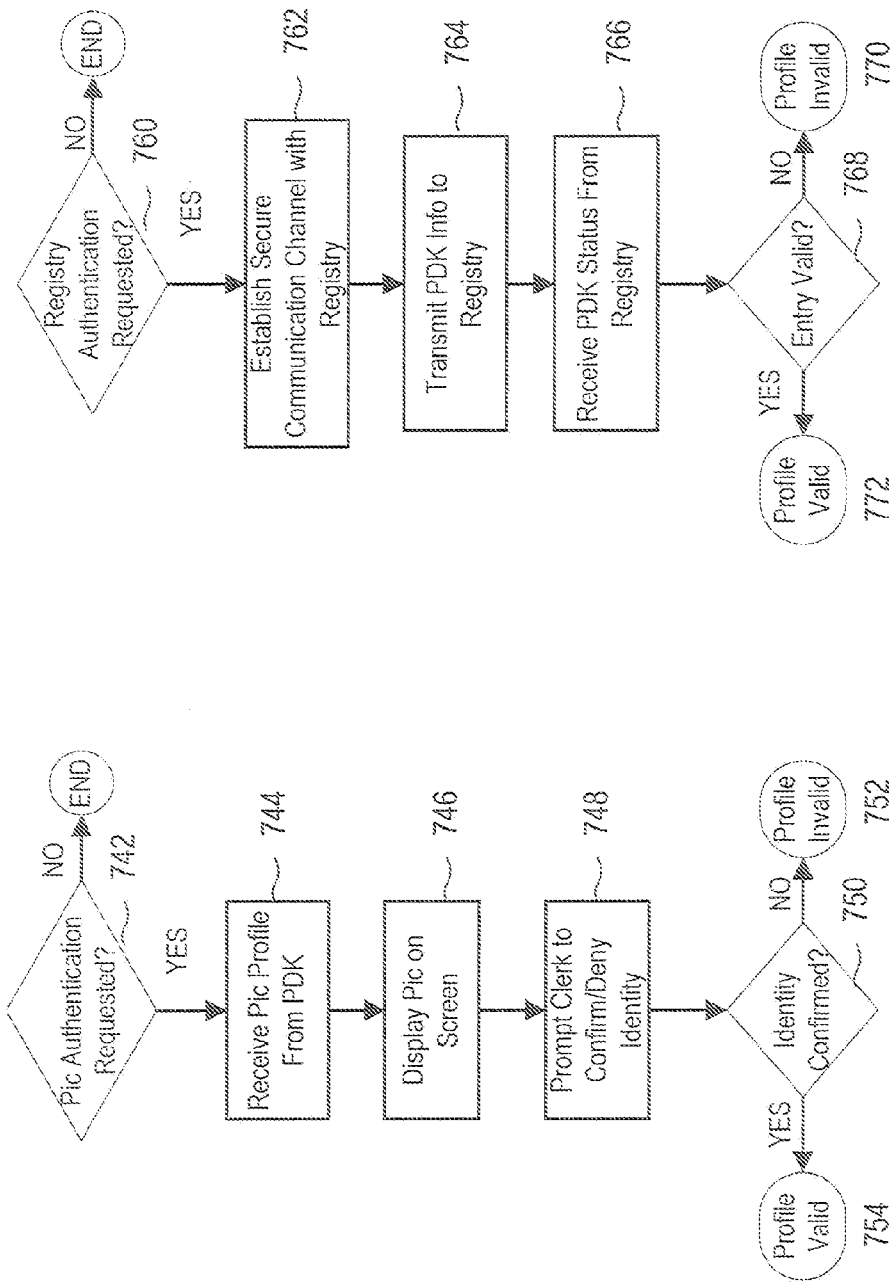
FIG. 7C is a flowchart illustrating one embodiment of a process for profile testing using a picture profile.
FIG. 7D is a flowchart illustrating one embodiment of a process for profile testing using a private or central registry.

FIG. 7C illustrates a process for a picture authentication. If the Reader 108 determines 724 that picture authentication is requested, a picture profile is received 744 from the PDK 102 by the Reader 108 and displayed 746 on a screen. An administrator (e.g., a clerk, security guard, etc.) is prompted 748 to compare the displayed picture to the individual and confirms or denies if the identities match. If the administrator confirms that the identities match, the picture profile is determined to be valid 764 and is otherwise invalid 752. In an alternative embodiment, the process is automated and the administrator input is replaced with a process similar to that described above with reference to FIG. 7A. Here, an image of the user is captured and face recognition is performed by comparing picture profile information received from the PDK 102 to the captured image.

FIG. 7D illustrates a process for authentication with a private registry 114 or the Central Registry 116. If the Reader 108 determines that registry authentication is requested, a secure communication channel is established 762 over the network 110 between the Reader 108 and one or more registries (e.g., the Central Registry 114, any private registry 116, or other validation database 112). If any additional information is needed to process the registry authentication (e.g., a credit card number), the Reader 108 requests and receives the additional information from the PDK 102. Identification information is transmitted 764 from the Reader 108 to the registry 114-116 through the network interface 308. The PDK status is received 766 from the registry to determine 768 if the status is valid 772 or invalid 770. In one embodiment, the information is processed remotely at the registry 114-116 and the registry 114-116 returns a validation decision to the Reader 108. In another embodiment, the Reader 108 queries the private 116 or Central registry 114 for information that is returned to the Reader 108. The information is then analyzed by the Reader 108 and the authorization decision is made locally. In one embodiment, the process involves transmitting credit card (or other purchasing information) to a validation database 112 to authorize the purchase and receive the status of the card. Status information may include, for example, confirmation that the card is active and not reported lost or stolen and that sufficient funds are present to execute the purchase.

Figure 8:
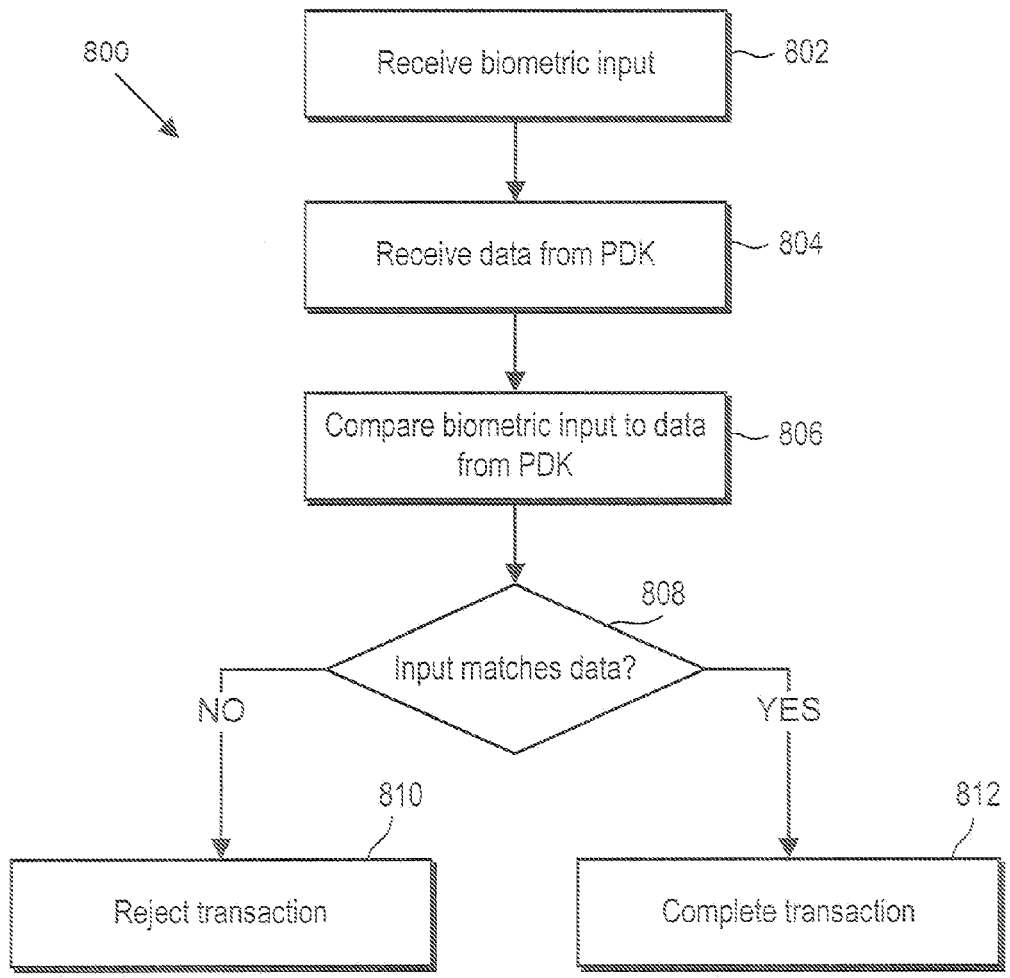
FIG. 8 is a flowchart illustrating one embodiment of a process for single step authentication of a transaction using proximity and biometric input.
Figure 9:
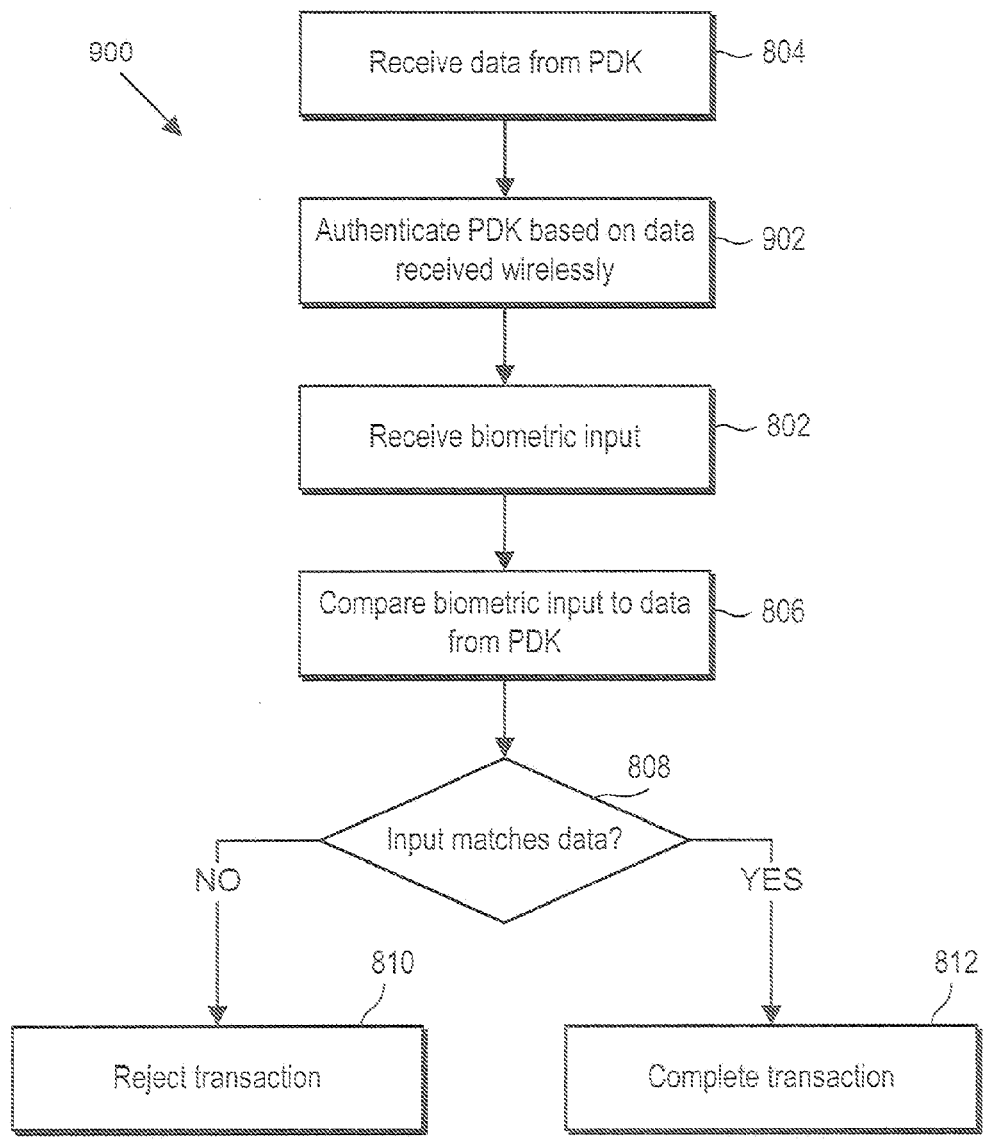
FIG. 9 is a flowchart illustrating a second embodiment of a process for single step authentication of a transaction using proximity and biometric input.
Figure 10:
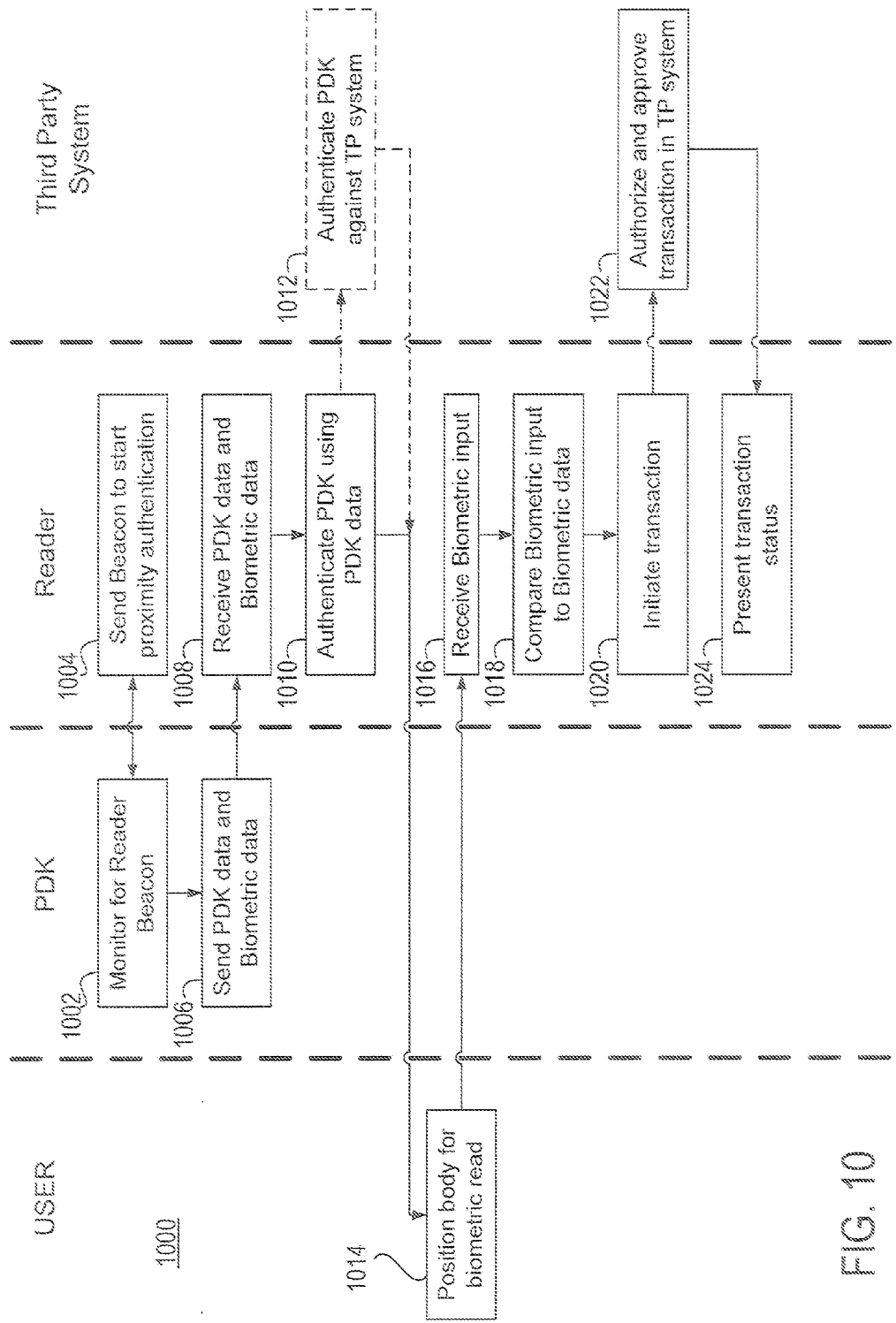
FIG. 10 is a flowchart illustrating a third embodiment of a process for single step authentication of a transaction using proximity and biometric input.

Referring now to FIGS. 8-10, additional embodiments of the present invention are described to show a method for single step transaction authentication. In particular, the present invention can be used to initiate and process transactions based on a single step, namely the inputting or receiving of a biometric input. This is particularly advantageous because of the ease of use for the end user. To authorize any type of purchase, the user need only perform the simplest of steps and allow his biometric data to be scanned. For ease of understanding and convenience, these embodiments of the present invention will now be described in a context where the biometric input is a finger print scan. However, it should be understood that this method can alternatively use any type of biometric characteristic including but not limited to fingerprint, retinal, iris, face, palm, DNA, RNA, or their derivatives used to establish identity, voice or signature characteristics that can each be uniquely associated with the individual. It should be noted the present invention is also advantageous because it provides multiple levels of authentication. While only requiring the user to scan their finger, the present invention provides multiple levels of authentication because of the employment of the PDK. The PDK allows the method to provide authentication of the PDK, and authentication of the biometric input responsive to receiving the finger print scan before authorizing or completing the transaction. Additionally for ease of understanding and convenience, these embodiments of the present invention will now be described in a context making a purchase of goods such as at any store.

Referring now to FIG. 8, one embodiment of a basic method for single step transaction authentication will be described. In this embodiment, only biometric input and wireless communication with the PDK 102 that stores a biometric reference is required. As has been noted above, this method is advantageous because the user need only place his finger on a scanner and the transaction is authorized and completed in a very secure manner. The method begins by receiving 802 biometric input. In this embodiment, the input of biometric data is also used as a trigger to begin the transaction. For example, the user need only place his finger on the biometric reader 302 of Reader 108, and a finger print scan is captured. In an alternate embodiment where the PDK 102 includes a biometric reader, the user simply places his finger on the reader built into the PDK 102 and the biometric input is captured. In this embodiment, the PDK 102 does the biometric comparison or the biometric input can be transmitted to the Reader 108 for processing. Next, the Reader 108 receives 804 biometric data from the PDK 102. As has been described above with reference to FIGS. 4-6 this communication process between the PDK 102 and the Reader 108 can take a variety of different formats, be done with a partially or completely secure communication channel, and include multiple levels of security. It should be understood that another advantageous feature of the claimed method is that the PDK 102 and the Reader 108 communicate wirelessly, and that the Reader 108 automatically detects when the PDK 102 is in proximity. Moreover, the operational frequency and power for communication between the PDK 102 and the Reader 108 are such that the user does not need to remove the PDK 102 from its location on his person. The PDK 102 can remain in the user's pocket, wallet, purse or other location, and does not need to be removed for communication with the Reader 108. Thus, the user literally need only have their finger print scanned to initiate and complete the transaction. The data transmitted from the PDK 102 to the Reader 108 for this embodiment requires biometric data for verification of the biometric input. Additional information can be transmitted by the PDK 102 as will be described in detail below with reference to FIG. 2.

Once the data from the PDK 102 has been received, the method compares 806 the biometric input received in 802 with the biometric data or profile received from the PDK 102 in 804. Then the method determines 808 whether the biometric input matches the biometric reference or profile. If not, the method rejects 810 the transaction and it is not approved. If, however, the biometric data matches the biometric input, the transaction is authorized 812 and completed. For example, the Reader 108 can complete the transaction by sending credit card and other information to a conventional credit card processing center to have the transaction approved by the credit card company. In this embodiment to minimize communication with the PDK 102 may be saved on a network accessible by the Reader 108. Similarly, the Reader 108 may initiate and process other level of security and authentication on the PDK data or profile provide according to the requirement or specification of any particular transaction.

Referring now to FIG. 9, a second embodiment 900 for single step authentication of a transaction using proximity, biometric input and PDK authentication will be described. The second embodiment 900 of the method uses many of the same processes that have been described above for the first embodiment 800. Therefore, for ease understanding and convenience like processes are labeled with like references numerals and their detailed description will not be repeated here. Rather, the differences between the second embodiment 900 and the first embodiment 800 of the method of the present invention will be described. It should be noted that the second embodiment 900 is similar to the first 800, however it provides an additional level of authentication by receiving additional information from the PDK 102 and validating the PDK 102. FIG. 9 also illustrates how the validation of the PDK 102 may occur before the biometric input thereby reducing the time the user must wait for the transaction to be authorized and completed. This is particularly important for live transaction processing such as when used by a cashier at any store. The process begins by receiving data 804 from the PDK 102. This process first automatically secures a communication link between the PDK 102 and the Reader 108 when the two devices are within a predefined proximity of each other. In this embodiment 900, receiving data 804 from the PDK 102 includes the biometric data as described above, but also includes PDK data that is required by the Reader to authenticate the PDK 102. For example, the PDK data may include a PDK identification number, a profile history and a data profile having security information according to the level of security required for authentication like profile authentication and profile testing described above. For most financial transactions, the data transmitted from the PDK 102 to the Reader 108 will also include credit card information and other security information for the transaction. Next, the method uses this received information to validate 902 the PDK. The data that was received wirelessly from the PDK 102 along with other information and algorithms in the Reader 108 are used to authenticate the PDK 102 as a valid one. This step may also include validating the RDC 304 of the Reader 108 as a valid RDC 304 as has been described above. While the PDK authentication has been described above as occurring before the biometric input, those skilled in the art will recognize that these steps could occur prior to or contemporaneously with the biometric input 802. Then method continues as has been described above by comparing 806 the biometric input received in 802 with the biometric profile received from the PDK 102 in 804, determining 808 whether the biometric input matches the biometric reference or profile, and either rejecting 810 the transaction or authorizing 812 and completing the transaction. In this embodiment, the Reader 108 can complete the transaction by sending credit card and other information to a conventional credit card processing center to have the transaction approved by the credit card company since the PDK wirelessly communicated this information to the Reader 108 in step 804. Similarly, the Reader 108 may initiate and process other level of security and authentication on the PDK data or profile provide according to the requirement or specification of any particular transaction. The reader can validate the parties and the transaction against third party system as has been described above. This second embodiment is illustrative of 1) two levels of authentication—biometric and PDK, 2) the independence of the order in which the biometric authentication and the PDK authentication occur; 3) the same minimal step required of the user for biometric input, for example, scanning the user's finger.

Referring now to FIG. 10, a third embodiment 1000 of a process for single step authentication of a transaction using proximity and biometric input. The third embodiment 1000 provides more detail of on a specific implementation. The third embodiment also illustrates more directly the specific device or entity performing the steps of this embodiment of the present invention. FIG. 10 is divided into four vertical sections with each section depicting portions of the process that are performed by that device or entity. The first and left most section shows the steps performed by the user, the second section and the next to the right show the steps performed by the PDK 102, the third section shows the steps performed by the Reader 108 and the right most section show the steps performed by a third party system such as the validation database 112, the central registry 114, a private registry 116 or the system of a credit card company. As is readily apparent from FIG. 10, the method of the present invention requires minimal but sufficient involvement from the user, namely the positioning of the user's body for biometric reading. This advantageously requires the user do almost nothing to approve a highly secure transaction, yet obtains user consent by capturing biometric information sufficient to ensure that the user is authorizing and agreeing to the transaction.

The process begins with the Reader 108 sending out a beacon signal to start the proximity authentication process. The beacon signal is preferably repeatedly sent such as at a periodic interval. The PDK 102 monitors 1002 for a beacon signal from any Reader 108 in range. If there is no such signal then the PDK 102 is outside the proximity range of any Reader 108. Once the PDK 102 detects a beacon, the PDK 102 responds by sending information to set up a secure communication channel. This process has been described above with reference to FIGS. 4-7. Any of the embodiments disclosed above may be used here. Once the secure communication channel has been established, the PDK 102 sends 1006 PDK data and biometric data to the Reader 108, in particular, the RDC 308. Then the Reader 108 receives 1008 the PDK data and biometric data, and temporarily store the data in working memory of the Reader 108. The Reader 108 then authenticates the PDK 102 using the PDK data. For example, the PDK data may include a profile 220. The Reader 108 validates the PDK 102 according to Reader's requirements and the requirements specified in the profile 200. This may be any number of types or combinations of authentication as has been described above with reference to FIGS. 6 and 7. In one alternate embodiment shown in FIG. 10 with dashed lines, the Reader 108 may communicate with a third party system such as a registry 112, 114, 116 to validate 1012 the PKD 102 and/or the Reader 108. After either step 1010 or 1012, the method continues with the user positioning 1014 his body for a biometric read. In one embodiment, this is swiping his finger over a reader. For the other type of biometric scanning, the user need only perform the affirmative act of allowing his body to be scanned such as for a retinal, face, palm, DNA analysis etc. Once the user has performed then inputting step 1014, the Reader 108 receives 1016 the biometric input. In this embodiment, the biometric reader 302 is part of Reader 108 so receipt is automatic. However, where the biometric reader is on the PDK 102, the PDK 102 wirelessly transmits the biometric input to the Reader 108 that in turn receives it. Next, the Reader 108 compares the biometric input from step 1016 to the biometric data from step 1008. If they do not match the process is complete and the transaction is rejected. If the biometric input matches the biometric data, the method initiates a transaction 1020 and communicates with a third party system to authorize and approve 1022 the transaction in the third party system. For example, this may be initiating the transaction by sending credit card information, associated credit card security information, information about the parties and the transaction to the credit card company. The credit card company then authorizes and approves 1022 the transaction in their system. A credit card company is used only by way of example, and the third party system could be a bank, any other financial institution, an electronic payment system such as PayPal®, immigration office, security administrator, or other like third party systems. Moreover, the Reader 108 could be a conventional computer with a transceiver and with access to the internet and third party system via secure connections. Once the transaction has been approved or denied by the third party system, the status is send back to the Reader 108 and presented 1024 to the user. Thus, from FIG. 10 and the above associated description it should be apparent how the present invention provides a very easy to used system 1000 that allow the user to engage in very secure transactions with multiple levels of security while only requiring a simple biometric input.

It should be noted that the biometric authentication described above is performed without the requirement of an external database containing biometric data to be searched. The security of maintaining all biometric data to be searched within the user-owned and carried PDK is apparent, as is the vastly improved speed in searching only those immediately surrounding PDK's for a match. Additionally, it will be noticed that in order to complete the transaction, the person possessing the PDK containing the secure data must provide the Reader 108 with a scan (or sample) of biologically identifying material. The importance of the foregoing to the tracking and apprehension of anyone fraudulently attempting to use another person's PDK will be understood by those skilled in the art, as well as extensions of this technology to act as an aid in law enforcement in the detection, tracking and retrieval of lost, stolen or fraudulently obtained PDK's.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

The invention claimed is:

1. A method for electronic transaction processing comprising:
   automatically and wirelessly receiving, using one or more processors, a first biometric sample from a first personal digital key device after the first personal digital key device has entered a proximity zone within a readable coverage area, wherein the first personal digital key device includes the first biometric sample and a first biometric profile associated with a valid user of the first personal digital key device, wherein the first biometric sample is a subset of the first biometric profile;
   automatically and wirelessly receiving, using the one or more processors, a second biometric sample from a second personal digital key device after the second personal digital key device has entered the proximity zone within the readable coverage area, wherein the second personal digital key device includes the second biometric sample and a second biometric profile associated with a valid user of the second personal digital key device, wherein the second biometric sample is a subset of the second biometric profile;
   receiving, using the one or more processors, a biometric input from a user;
   comparing, using the one or more processors, the biometric input to a collection of biometric samples received from and associated with personal digital key devices within the proximity zone for a match, the collection of biometric samples including the first biometric sample and the second biometric sample when the first personal digital key device and the second personal digital key device are within the proximity zone within the readable coverage area;
   determining, using the one or more processors, that the biometric input from the user matches the first biometric sample from the first personal digital key device;
   based on the biometric input matching the first biometric sample from the first personal digital key device in the collection of biometric samples received from and associated with personal digital key devices within the proximity zone, determining, using the one or more processors, that the first personal digital key device from personal digital key devices within the proximity zone is to be associated with a transaction;
   after determining that the first personal digital key device is associated with the transaction, determining, using the one or more processors, whether the biometric input of the user matches the first biometric profile associated with the valid user of the first personal digital key device;
   authenticating, using the one or more processors, without user intervention, the first personal digital key device after the first personal digital key device has entered the readable coverage area; and
   authorizing, using the one or more processors, the transaction responsive to the authentication of the first personal digital key device and determining that the biometric input matches the first biometric profile associated with the valid user of the first personal digital key device.

2. The method of claim 1, wherein receiving the biometric input includes performing at least one of a fingerprint scan, a retinal scan, an iris scan, a facial scan, a palm scan, a DNA analysis, a signature analysis, and a voice analysis.

3. The method of claim 1, wherein the user provides the biometric input and the transaction is authorized without further action by the user.

4. The method of claim 1, wherein the first personal digital key device includes a personal digital key identification number and one or more of financial information, credit card information and personal identification information.

5. The method of claim 1, wherein authenticating the first personal digital key device begins before comparing the biometric input.

6. The method of claim 1, wherein comparing the biometric input is received before authenticating the first personal digital key device.

7. The method of claim 1, wherein authenticating the first personal digital key device includes receiving data from the first personal digital key device and comparing it against an external system.

8. The method of claim 1, wherein the first personal digital key device determines that the biometric input of the user matches the biometric profile associated with the valid user of the first personal digital key device.

9. The method of claim 1, further comprising the steps of:
   obtaining, responsive to the biometric input matching the first biometric sample from the first personal digital key device and determining that the first personal digital key device is associated with the transaction, the biometric profile associated with the valid user of the first personal digital key device from the first personal digital key device.

10. The method of claim 1, wherein the proximity zone and the readable coverage area are associated with a reader device and wherein receiving the biometric input, authenticating the first personal digital key device, and comparing the biometric input to the first biometric profile are performed by the reader device.

11. The method of claim 1, wherein the biometric input received is a calculated representation of one or more of a physical and a behavioral characteristic based on input received by a biometric sensor.

12. The method of claim 1, wherein authorizing the transaction comprises:
   communicating with another system to authorize and approve the transaction; and
   presenting a status for the transaction.

13. The method of claim 1, further comprising the steps of:
   receiving a first picture profile from the first personal digital key device, the first picture profile including a picture associated with the valid user of the first personal digital key device; and
   displaying the picture profile associated with the valid user of the first personal digital key device to an administrator.

14. The method of claim 1, further comprising:
   using at least one of financial information, credit card information and personal identification information received from the first personal digital key to complete the transaction, wherein the transaction is a financial transaction, the first personal digital key device including the at least one of the financial information, the credit card information and the personal identification information.

15. A system comprising:
one or more processors; and
a memory including instructions that when executed by the one or more processors cause the one or more processors to:
- automatically and wirelessly receive a first biometric sample from a first personal digital key device after the first personal digital key device has entered a proximity zone within a readable coverage area, the first personal digital key device including the first biometric sample and a first biometric profile associated with a valid user of the first personal digital key device, wherein the first biometric sample is a subset of the first biometric profile;
- automatically and wirelessly receive a second biometric sample from a second personal digital key device after the second personal digital key device has entered the proximity zone within the readable coverage area, the second personal digital key device including the second biometric sample and a second biometric profile associated with a valid user of the second personal digital key device, wherein the second biometric sample is a subset of the second biometric profile;
- receive a biometric input from a user;
- compare the biometric input to a collection of biometric samples received from and associated with personal digital key devices within the proximity zone for a match, the collection of biometric samples including the first biometric sample and the second biometric sample when the first personal digital key device and the second personal digital key device are within the proximity zone within the readable coverage area;
- determine that the biometric input from the user matches the first biometric sample from the first personal digital key device;
- based on the biometric input matching the first biometric sample from the first personal digital key device in the collection of biometric samples received from and associated with personal digital key devices within the proximity zone, determine that the first personal digital key device is associated with a transaction;
- after determining that the first personal digital key device is associated with the transaction, determine whether the biometric input of the user matches the biometric profile associated with the valid user of the first personal digital key device;
- authenticate, without user intervention, the first personal digital key device after the first personal digital key device has entered the readable coverage area; and
- authorize the transaction responsive to the authentication of the first personal digital key device and determining that the biometric input matches the first biometric profile associated with the valid user of the first personal digital key device.

16. The system of claim 15, wherein the user provides the biometric input and the transaction is authorized without further action by the user.

17. The system of claim 15, the instructions when executed further causing the system to use at least one of financial information, credit card information and personal identification information received from the first personal digital key to complete the transaction, wherein the transaction is a financial transaction, the first personal digital key device including the at least one of the financial information, the credit card information and the personal identification information.

18. The system of claim 15, wherein the authentication of the first personal digital key device includes comparing a personal digital key device identifier associated with the first personal digital key device against an external system, the external system including one or more of a central registry, a validation database and a private registry.

19. The system of claim 15, wherein authorizing the transaction comprises:
communicating with another system to authorize and approve the transaction; and
presenting a status for the transaction.

20. The system of claim 15, wherein the biometric input received is a calculated representation of one or more of a physical and a behavioral characteristic based on input received by a biometric sensor.

* * * * *